(12) United States Patent
Buliani et al.

(10) Patent No.: US 12,530,173 B1
(45) Date of Patent: Jan. 20, 2026

(54) GRAPHICAL USER INTERFACE FOR GENERATIVE AI SOFTWARE DEVELOPMENT ASSISTANT

(71) Applicant: Amazon Technologies, Inc., Seattle, WA (US)

(72) Inventors: Stefano Buliani, Vancouver (CA); Clare E. Liguori, Bainbridge Island, WA (US); Deepak Singh, Seattle, WA (US); Molly Alexander Adair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 18/345,947

(22) Filed: Jun. 30, 2023

(51) Int. Cl.
*G06F 8/34* (2018.01)

(52) U.S. Cl.
CPC ...................... *G06F 8/34* (2013.01)

(58) Field of Classification Search
None
See application file for complete search history.

(56) References Cited

U.S. PATENT DOCUMENTS

| | | | |
|---|---|---|---|
| 11,029,947 B2 | 6/2021 | Jayaraman et al. | |
| 11,182,163 B1 | 11/2021 | Beals et al. | |
| 11,340,968 B1 * | 5/2022 | Malamut | G06F 9/547 |
| 11,815,943 B1 * | 11/2023 | Rosendahl | G06F 9/547 |
| 11,816,455 B2 | 11/2023 | Bodin et al. | |
| 11,894,996 B2 * | 2/2024 | Yadav | H04L 63/20 |
| 11,934,801 B2 | 3/2024 | Rahmani et al. | |
| 12,210,839 B1 | 1/2025 | Burton | |
| 12,307,168 B2 * | 5/2025 | Orsos Barrenechea | G06Q 10/087 |

(Continued)

FOREIGN PATENT DOCUMENTS

EP   3616064 B1 *   3/2023   ......... H04L 41/0893

OTHER PUBLICATIONS

Huang, Xin et al., "Question Answering Using Retrieval Augmented Generation with Foundation Models in Amazon SageMaker JumpStart", AWS Machine Learning Blog dated May 2, 2023, Available at <https://aws.amazon.com/blogs/machine-learning/question-answering-using-retrieval-augmented-generation-with-foundation-models-in-amazon-sagemaker-jumpstart/>, 12 pages.

(Continued)

*Primary Examiner* — Philip Wang
(74) *Attorney, Agent, or Firm* — Nicholson De Vos Webster & Elliott LLP

(57) ABSTRACT

Techniques for displaying a graphical user interface of a software development system are described. An initial description of an initial structure of a software system is obtained, the initial description including an identification of interconnections amongst provider network resources that form the initial structure. A modified description of a modified structure of the software system is obtained, the modified structure based on at least a change to the initial structure of the software system described in the initial description. A difference between the initial description and the modified description is determined. An electronic device is caused to display a graphical user interface including a visual depiction of the initial structure of the software system and an indication of the difference, the visual depiction based at least in part on the initial description.

20 Claims, 30 Drawing Sheets

(56) References Cited

U.S. PATENT DOCUMENTS

| | | |
|---|---|---|
| 2006/0200748 A1 | 9/2006 | Shenfield |
| 2007/0266039 A1* | 11/2007 | Boykin .................... G06F 8/34 707/999.102 |
| 2008/0140705 A1* | 6/2008 | Luo ....................... G06F 40/169 |
| 2009/0138898 A1* | 5/2009 | Grechanik ............... G06F 8/20 719/328 |
| 2010/0114962 A1 | 5/2010 | Ahadian et al. |
| 2016/0085545 A1* | 3/2016 | Togan .................. G06F 9/4486 717/121 |
| 2016/0283228 A1 | 9/2016 | Sullivan |
| 2017/0024311 A1 | 1/2017 | Andrejko et al. |
| 2017/0235661 A1 | 8/2017 | Liu et al. |
| 2020/0117446 A1 | 4/2020 | Smith et al. |
| 2020/0167134 A1 | 5/2020 | Dey et al. |
| 2020/0272435 A1 | 8/2020 | Apte et al. |
| 2021/0263643 A1* | 8/2021 | Thom .................. G06F 3/04817 |
| 2021/0374558 A1 | 12/2021 | Tommasi et al. |
| 2022/0019427 A1 | 1/2022 | Davis et al. |
| 2022/0261242 A1 | 8/2022 | Pakiteeri et al. |
| 2022/0342779 A1* | 10/2022 | Minarik ............... G06F 11/3409 |
| 2023/0185594 A1 | 6/2023 | Venkatram et al. |
| 2023/0280985 A1 | 9/2023 | Hayashi et al. |
| 2023/0376841 A1 | 11/2023 | Le et al. |
| 2023/0409290 A1* | 12/2023 | Duggal .................... G06F 8/316 |
| 2024/0004361 A1* | 1/2024 | Morris .................... G05B 15/02 |
| 2024/0070288 A1* | 2/2024 | Koteshwara ............ G06F 21/54 |
| 2024/0095463 A1 | 3/2024 | Leary et al. |
| 2024/0220229 A1* | 7/2024 | Matos .................... G06F 8/65 |
| 2024/0220393 A1* | 7/2024 | Matos ................. G06F 11/0793 |
| 2024/0220505 A1 | 7/2024 | Shashi et al. |
| 2024/0256423 A1 | 8/2024 | Zhang et al. |
| 2024/0281218 A1 | 8/2024 | Masad et al. |
| 2024/0283675 A1* | 8/2024 | Pelski ............... G06F 16/24526 |
| 2024/0311087 A1 | 9/2024 | Bathula |
| 2024/0311090 A1 | 9/2024 | Duggal et al. |
| 2024/0311114 A1 | 9/2024 | Duggal et al. |
| 2024/0311375 A1 | 9/2024 | Bisti et al. |
| 2024/0345807 A1 | 10/2024 | Duggal et al. |
| 2024/0354065 A1 | 10/2024 | Stephens et al. |
| 2024/0354501 A1 | 10/2024 | Bouguerra et al. |
| 2024/0362209 A1 | 10/2024 | Almaer et al. |
| 2024/0403438 A1 | 12/2024 | Chan et al. |
| 2024/0419917 A1 | 12/2024 | Clement et al. |
| 2024/0427564 A1 | 12/2024 | Petrov et al. |
| 2024/0427566 A1 | 12/2024 | Lin et al. |
| 2024/0427567 A1 | 12/2024 | Murthy et al. |
| 2024/0427994 A1 | 12/2024 | Odland et al. |
| 2025/0004915 A1 | 1/2025 | Rudenko et al. |
| 2025/0077227 A1 | 3/2025 | Guttridge et al. |

OTHER PUBLICATIONS

Osika, Anton. "GPT Engineer", GitHub, Downloaded from <https://github.com/AntonOsika/gpt-engineer> on Jul. 13, 2023, 4 pages.

"Template Anatomy", AWS CloudFormation User Guide, Downloaded from <https://docs.aws.amazon.com/AWSCloudFormation/latest/UserGuide/template-anatomy.html> on Jul. 13, 2023, 5 pages.

"Getting Started—Concepts", Downloaded from <https://web.archive.org/web/20230530025306/https://python.langchain.com/en/latest/getting_started/concepts.html> on Jun. 19, 2023, 3 pages.

"Getting Started—Quickstart Guide", Downloaded from <https://web.archive.org/web/20230520225431/https://python.langchain.com/en/latest/getting_started/getting_started.html> on Jun. 19, 2023, 14 pages.

"Getting Started—Tutorials", Downloaded from <https://web.archive.org/web/20230521001928/https://python.langchain.com/en/latest/getting_started/tutorials.html> on Jun. 19, 2023, 4 pages.

A. Fan et al., "Large Language Models for Software Engineering: Survey and Open Problems," in 2023 IEEE/ACM International Conference on Software Engineering: Future of Software Engineering (ICSE-FoSE), Melbourne, Australia, 2023, pp. 31-53, (Year: 2023).

Chen M, Tworek J, Jun H, Yuan Q, Pinto HP, Kaplan J, Edwards H, Burda Y, Joseph N, Brockman G, Ray A. Evaluating large language models trained on code. arXiv preprint arXiv:2107.03374. Jul. 7, 2021. (Year: 2021).

Non-Final Office Action, U.S. Appl. No. 18/345,925, May 22, 2025, 15 pages.

Non-Final Office Action, U.S. Appl. No. 18/345,959, Mar. 27, 2025, 30 pages.

Ross, Steven, et al., The Programmer's Assistant User Experience, IUI '23 Companion: Companion Proceedings of the 28th International Conference on Intelligent User Interfaces, Mar. 2023, 3 pages, [retrieved on May 16, 2025], Retrieved from the Internet: <URL: http://dl.acm.org/>.

Final Office Action, U.S. Appl. No. 18/345,959, Oct. 8, 2025, 31 pages.

Non-Final Office Action, U.S. Appl. No. 18/345,938, Aug. 4, 2025, 19 pages.

Notice of Allowance, U.S. Appl. No. 18/345,925, Sep. 23, 2025, 12 pages.

\* cited by examiner

EXAMPLE PROMPT TEMPLATES 412

PLACEHOLDER 402 — TROUBLESHOOTING_PROMPT = "ACT LIKE A TROUBLESHOOTING AGENT FOR A CLOUD SERVICES PROVIDER. BELOW YOU'LL FIND AN ERROR DESCRIPTION:
{USER_PROMPT}

YOUR JOB IS TO RESPOND WITH SPECIFIC RESOLUTION STEPS FOR SOLVING THE ERROR. I CAN PROVIDE ADDITIONAL INFORMATION FROM VARIOUS SOURCES TO ASSIST YOU ON YOUR JOB.

PLACEHOLDER 404 — THOSE SOURCES ARE {AVAILABLE_DATA_SOURCES}

TO BEGIN, PROVIDE AN IDENTIFICATION OF THE SOURCES, IF ANY, THAT WOULD ASSIST YOU ON YOUR JOB. RESPOND {RESPONSE_DEFINITION}"

PLACEHOLDER 406 — PROJECT_DESIGN_PROMPT_START = "ACTING AS A PRINCIPAL SOFTWARE DEVELOPMENT ENGINEER, YOU ARE TASKED WITH DEVELOPING A SET OF REQUIREMENTS FOR THE FOLLOWING SOFTWARE PROJECT.

{USER_PROMPT}.

YOU CAN ASK CLARIFYING QUESTIONS ABOUT THE PROJECT. LIMIT THE NUMBER OF CLARIFYING QUESTIONS TO NO MORE THAN TEN QUESTIONS. RESPOND {RESPONSE_DEF_NUMBERED_QUESTIONS_NOCONTEXT}"

...

EXAMPLE RESPONSE DEFINITIONS 414

RESPONSE_DEF_YN="YES OR NO"

RESPONSE_DEF_BULLETED_ITEMS_NOCONTEXT="WITH A BULLETED LIST OF ITEMS. DO NOT INCLUDE ANY TEXT SURROUNDING THE BULLETED LIST"

RESPONSE_DEF_NUMBERED_ITEMS="WITH A NUMBERED LIST OF ITEMS"

RESPONSE_DEF_SINGLE_QUESTION_NOCONTEXT="WITH A SINGLE QUESTION. DO NOT INCLUDE ANY TEXT OUTSIDE OF THE QUESTIONS OR THE NUMBERED LIST"

RESPONSE_DEF_NUMBERED_QUESTIONS_NOCONTEXT="WITH A NUMBERED LIST OF QUESTIONS. DO NOT INCLUDE ANY TEXT OUTSIDE OF THE QUESTIONS OR THE NUMBERED LIST"

GRAPHICAL USER INTERFACE FOR GENERATIVE AI SOFTWARE DEVELOPMENT ASSISTANT

BACKGROUND

Machine learning (ML) refers to a discipline by which computer systems can be trained to recognize patterns through repeated exposure to training data. The use of a trained model in production is often referred to as "inference," during which the model receives new data that was not in its training data set and provides an output based on its learned parameters. In contrast to machine learning (ML), artificial intelligence (AI) refers to a human perception of a computer system as possessing a capability typically considered to require intelligence.

Large language models (LLMs) are ML/AI systems designed to understand and generate human-like text. These models are trained using machine learning techniques, typically on vast amounts of text data from the internet, books, articles, and other sources. Often, LLMs use a type of neural network called a transformer to process and understand the patterns and structures of language.

The underlying model of an LLM often consists of millions or even billions of model parameters, which are adjustable values that determine how the model behaves. The models are typically trained using a process called unsupervised learning, where they learn to predict the next word or sequence of words in a sentence based on the context provided. By doing so, LLMs develop an understanding of grammar, syntax, and semantics. As a result, LLMs are being increasingly deployed to aid in a variety of fields, including customer support, healthcare, language translation, education, software development, finance, and more.

BRIEF DESCRIPTION OF DRAWINGS

Various examples in accordance with the present disclosure will be described with reference to the drawings, in which:

FIG. 4 depicts example templates and response definitions according to some examples.

DETAILED DESCRIPTION

Figure 1:
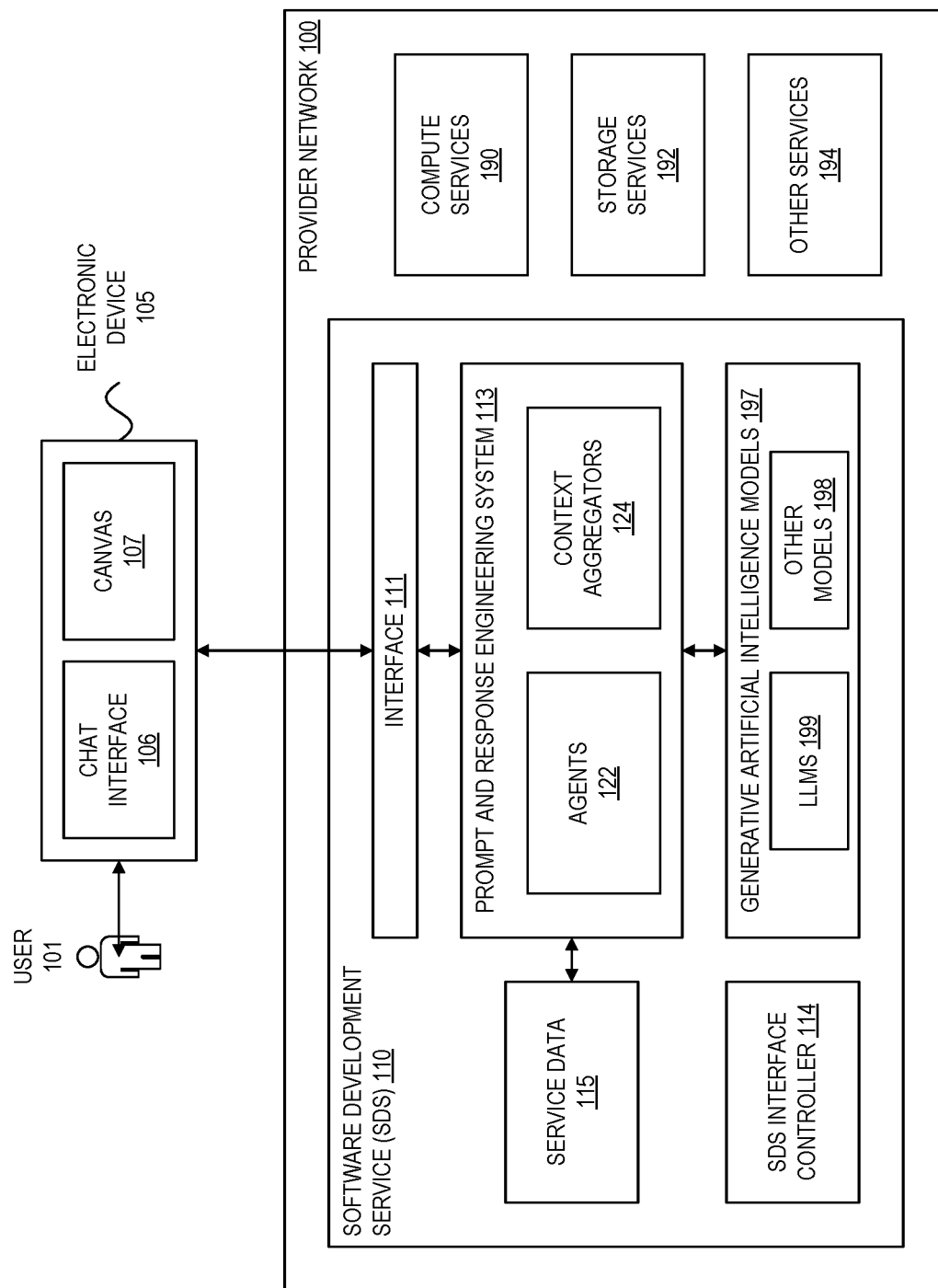
FIG. 1 depicts a high level overview of software development service and environment according to some examples.

The present disclosure relates to an AI-powered developer productivity assistant that works alongside software developers to help them with different tasks such as designing, coding, and testing changes to software applications, and fixing errors or bugs in software applications. This productivity assistant can be provided as a software development service (SDS) in a cloud provider network and/or can be integrated into a development environment, in various implementations. The SDS supports a broad array of tasks, from small bug fixes to sweeping refactoring changes that impact multiple inter-dependent applications. Because it understands developers' intent, the SDS can also generate tests that validate the application's behavior in various failure modes, making it easier to deliver highly-available software to production quickly and reliably.

As described above, the SDS can help developers fix errors, bugs, and vulnerabilities in a software program. Specifically, the SDS can identify errors, propose a course of action to mitigate those errors, and mitigate those errors on behalf of the developer such as by recommending specific code changes. In some scenarios, a developer may get an error notification from another service or program and be able to select an option to resolve the error, which can call the SDS to propose the steps to fix the error and/or the mitigation for the error.

Further, as described above, the SDS can use AI such as an LLM to understand an application's architecture and the changes that developers want to make. As a first step, a developer can inform the SDS of where their application source code is located. The SDS then analyzes the source code, any documentation about the application, and information about the resources that comprise the application (ex: specific compute and storage resources) to understands the application code and architecture, for example by querying the APIs of other services to gather information about the application's resources and configuration. If there are areas of the task which are uncertain, the SDS can identify these areas and request clarification from the user before generating the development plan and proposed changes. The SDS can clarify requirements, acceptance criteria for the change, and the trade-offs of multiple architectural options in terms of scalability, availability, and cost. With this information, the SDS can suggest code and architectural changes and may present these graphically using an interactive canvas to visually convey the ramifications of a change, enabling developers to complete their tasks in a fraction of the time. Specifically, given a natural language summary of a task or goal a developer wants to accomplish, the SDS can use architectural diagrams and textual descriptions to give the developer context about the application they are modifying and the surrounding systems, as well as a step-by-step guidance on the changes required to complete the task and any repercussions of the change. Because it is familiar with the broader system architecture, the SDS can also alert the developer to upstream and downstream dependencies that are impacted by a change. Using the task definition and context information about the application, the SDS generates the necessary application code changes and presents them to the developer. Once a developer accepts a proposed architecture, the SDS can submit a pull request to their source management system that includes the generated changes. Using the code review feature of source management systems, developers can iterate on the proposed code changes with the SDS to make sure they meet their requirements.

To provide an example, a developer may describe a change such as 'switch the frontend of my application's container cluster to application load balancer.' The SDS can inspect the application's source code, propose a list of next steps, such as 'create a new application load balancer', 'configure round-robin load balancing across containers', 'test the load balancer with example traffic', and 'add an alarm for error messages from the cluster', and include for each step the required CLI commands, infrastructure-as-code, application code, and tests. The developer can quickly validate the proposed changes, make any needed edits, and apply them in a single click. Other non-limiting examples of use cases include adding payment processing using a particular API, modernizing code by breaking a monolith into microservices, refactoring an application from one framework to another, or adding authentication using an authentication service API.

Developers can interact with the SDS through multiple user interfaces, such as a console chat window, directly in their preferred development environment, or through comments in their source and task management systems. The SDS can include a chat that allows developers to specify their task and clarify requirements or respond to follow up questions from the SDS, as well as an interactive canvas for displaying the system architecture. The SDS can display the list of needed actions and list of required changes to accomplish the task both as text in the chat window and visually on the architecture diagram, helping the developer easily assess the scope and impact of changes. Clicking on the action list in the chat response or on the visual canvas notifications can cause display of the changes the SDS recommends. As an example, for code changes, the SDS can show a code diff and open the developer's specified development environment to apply the change; for infrastructure changes, the SDS can show the infrastructure-as-code changes directly in the visual architecture representation. Using this multimodal interface, the developer can quickly inspect the proposed change, amend it if necessary, and apply it in a single click. The developer can amend code changes in their development environment or by telling the SDS via the chat what changes need to be made, and can make architectural changes by interacting with the visual diagram which triggering the SDS to create corresponding new changes. The SDS can also display a list of all tests available for the workload in a panel on its visual canvas, making it easy to apply the recommended changes and execute the tests that validate the application's behavior in a couple of clicks. If any errors are identified during testing, the SDS can perform error resolution as described above. When used with task managed systems, the SDS can act as a bot, suggesting changes and responding to developers' questions in the comments section of each task.

It will be appreciated that source code and documentation can be highly proprietary and so the SDS will not use such content from one developer for purposes of assisting other developers, but rather keeps any source code, documentation, and/or learnings based on such materials (ex: trainings or fine tuning of any of its models) within the boundaries of the owning user's account. The SDS may also expose an API that users can use to fine-tune its model(s) for their use cases and provide additional runtime context. Accordingly, there may be many slightly different copies of the ML/AI of the SDS, each tuned to support a specific developer or organization based on their proprietary code and documentation.

Accordingly, disclosed are methods, apparatus, systems, and non-transitory computer-readable storage media for a SDS. The SDS can assist with a variety of software development efforts, including for complex tasks that involve multi-step reasoning or require large amounts of user-specific context, by leveraging generative artificial intelligence (GAI) models such as large language models (LLMs). GAI models can create new data instances as output. A new data instance means that it is generated by the model based on the model parameters and is not carried over from the model input or otherwise copied from outside the model (for example, from an index of searchable content). Example efforts include developing software project plans, dividing development tasks into sub-tasks or actions, and troubleshooting errors. The SDS acts as an intermediary between users and GAI models, enriching user prompts with additional instructions and/or context, monitoring model responses, and, in some cases, performing various "under-the-hood" interactions with the model without requiring action by the user.

In some examples, the SDS includes agent applications that formalize various software development effort workflows and their interactions with an LLM. Agent applications serve as an intermediary between a user and an LLM, operating to expand user prompts, curate LLM responses, and provide the LLM with additional context often without user intervention. Additionally, various control mechanisms that regulate interactions with an LLM are introduced by way of example in the agent applications. Such control mechanisms can be used to avoid circular conversations with an LLM, keep the LLM on task, validate LLM responses, etc.

Existing LLMs have a very unidirectional conversation approach that require users to have a well specified question or prompt to get a result that matches their expectations. With a well-defined prompt, LLM systems can create or modify software systems in a manner that respects the boundaries of the given description. While this is an impressive feature, it lacks the interaction that usually happens between engineers and product managers during the requirements engineering phase in which design considerations for a software system are defined. In some examples, a system design agent of the SDS can cause an LLM to ask clarifying questions regarding an initial prompt to gather answers to various design considerations. Such design considerations can include scope, requirements, and priorities, such as the geographic region(s) in which to host the system, whether the application should be distributed, the expected workload of the system (e.g., to understand how much compute and storage resources to allocate), the types of compute and/or storage resources to use to host the system, programming languages and/or frameworks to use or leverage, whether the application should operate with synchronous or asynchronous transfers between components, which aspects of the CAP (Consistency, Availability, Partition tolerance) theorem to prioritize (in the case of a distributed system), etc. The SDS can gather additional information about existing software systems associated with the user. Using that gathered information, the SDS can attempt to answer the clarifying questions. For example, if a question involves the specification of a programming language to use for a task, the SDS can infer that a client would use Python where the system (if modifying an existing system) or most of the other systems of the client (if creating a new system) are authored in Python. When a clarifying question from the LLM remains unanswered from the gathered information, the SDS can prompt the client to provide an answer. When answering the SDS's clarifying questions with information that is relevant beyond the current project and task, such as a company's preference for private subnets in a VPC, developers can ask the SDS to retain this information for future reference and share it across accounts within their same organization. These preferences are stored alongside any business jargon dictionary and used to augment future prompts to the SDS's model. By providing answers to the LLM's clarifying questions, the SDS improve the degree to which the LLM can propose solutions that meet the client's design requirements.

In some examples, a development task agent of the SDS can cause an LLM to subdivide a given software development task into discrete actions by prompting the LLM for the set of actions a user would need to take to complete a particular task. Exemplary tasks include modifying an interface between software components, adding support for a new feature, changing an order processing backend on a website, migrating data from one database to another, etc. For each action, the development task agent obtain detailed actions from the LLM for the developer to take to complete the action. The development task agent tracks the gathering of this detailed information, keeping the LLM on task by including context related to the status of the additional detailed information gathering in subsequent prompts. Doing so avoids relying on the "memory" of the LLM, which often is limited in size and can fade as the number of interactions with the LLM increases, often resulting in unwanted effects such as straying off task. In some examples, the detailed actions include generated code snippets, which the development task agent can provide to the user such as with a link to the source code file in which the change is to be made, a display of a code diffs (e.g., a display of the code indicating before and after the suggested to-do), and other information. In some examples, the stored tracking data allows users to iteratively break down particular actions into more discrete actions (e.g., a top level task divided into a plurality of level 1 tasks, a level 1 tasks divided into a plurality of level 2 tasks, and so on).

In some examples, an error resolution agent of the SDS can cause an LLM to generate a suggested resolution for an error. Errors can be submitted by the user in a variety of ways. For example, in some cases a user might submit an error by pasting an error message into a dialog box of a chat-based interface. As another example, another client in the form of a software application might invoke the error resolution agent via an API call to the SDS. Example software applications include an error logging application or service that records errors that occur during execution of a software application, software project management applications that track end-user reports of errors or bugs, software development environments, etc. An error resolution agent can gather additional details regarding the error in responses from the LLM and provide those responses in subsequent prompts. By increasing the level of specificity about the error that is provided to the LLM in these chained prompts, the error resolution agent can prompt the LLM for specific error resolutions, such as suggested code or configuration changes.

In some examples, agents submit prompts to an LLM by populating prompt templates. Prompt templates can include language that provides meaningful context to the LLM, scoping a particular task, and governing the overall flow of completing that task. Prompt templates can include placeholders that agents populate with context-specific information, whether gathered from a user or from other resources available to that agent. Prompt templates can also include response definitions that define the expected response to the prompt. For example, one response definition might indicate that the response should be a Yes or No while another response definition might indicate that the response should be executable code in a given programming language.

FIG. 1 depicts a high level overview of an SDS and environment according to some examples. An SDS 110 acts as an intermediary that interfaces with generative artificial intelligence (GAI) models, such as language models, on behalf of clients. Language models probabilistically generate natural language (e.g., the word "said" is more likely to appear after the word "he" than after the word "dolphin"). LLMs are one type of language model developed with a neural network architecture often including millions or even billions of model parameters, which are trained using datasets of documents that determine how the model behaves. The size of such datasets can include thousands, millions, or even more documents. Exemplary LLMs include OpenAI's GPT-3.5 and GPT-4, Google's PaLM or PaLM 2, etc. As an intermediary, the SDS 110 can manage client interactions with GAI models. For example, the SDS 110 can expand received prompts before submitting them to an LLM and can curate LLM responses. Expanding prompts can provide the LLM with additional information relevant to a particular task, including by adding additional context about the nature of the task and by adding context-specific details. With prompt expansion, the SDS 110 can improve the quality of LLM responses. Curating LLM responses verify LLM responses are within the scope of a given task, validate that the LLM responses are syntactically correct, etc. In some examples, the SDS can manage some exchanges of information with a language model such as the LLM 199 without engaging or with limited engagement of a client.

One common environment for an SDS is a provider network 100. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 via one or more interface(s), such as through use of application programming interface (API) calls, via a console implemented as a website or application, etc.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The SDS 110 can assist users with various software development tasks. Example software development tasks include development of software project plans, subdividing a software development task into steps, and troubleshooting software errors. Strung end-to-end, these tasks can represent a large portion of an overall software development effort, from planning to implementation and troubleshooting. Note that as used herein, a software system can refer to an individual program or to a collection of programs, context about the program(s) such as their operating environment and/or structure on which they are executed or distributed (e.g., cloud-level resources), mappings of communications or data flows between the programs (if applicable), etc.

As illustrated, the SDS 110 includes an interface 111, a prompt and response engineering system 113 that includes agents 122 and context aggregators 124, service data 115, and LLMs 199. The interface 111, typically an API, provides different entry points for clients to interact, via the SDS 110, with an LLM 199. A user 101 interacts with an SDS 110 via an electronic device 105. The electronic device 105 can display one or both of a chat-based interface 106 and a canvas interface 107. Interfaces 106, 107 send and receive data via the interface 111 of the SDS 110. The chat-based interface 106 can be part of a graphical user interface providing a "chat" type interface commonly associated with LLMs in which users can type text and receive responses.

The canvas 107 can provide the display of graphical architecture diagrams of software system and allow users to make modifications to their software systems. For example, the canvas 107 can use different icons to represent different resources (or clusters of similar resources such as autoscaling groups) of an application, and can connect these icons via lines to show network flows between the different resources. The SDS can maintains a model of the application architecture visualized in the canvas that it can translate into infrastructure as code ("IaC") definitions, and can also translate IaC definitions into visual architecture diagrams.

The interface 111 can also provide a more programmatic entry point for other applications or services such as an issue management service (also sometimes referred to as issue tracking service), a logging service of the provider network, or the application displaying the interfaces 106, 107 (e.g., a software development environment or issue management application executed by the electronic device 105). API calls via these type entry points can include, like the chat-based interface, free-form text (e.g., bug descriptions or change requests from an issue tracking system, error messages from the logging service 208, etc.) but further include additional contextual parameters available to the application or application environment issuing the call (e.g., an identification of the code repository associated with a particular software change request, an identification of the cloud-hosted instance generating a log entry, etc.).

Generally speaking, the SDS API 111 can provide for interactions with various clients, including human users such as user 101 via interfaces 106, 107, and with other applications such as software development environments, software management systems, issue tracking systems, etc. These application-based clients typically interact with the SDS API via calls having a more structured set of parameters (e.g., accepting a structured format file that includes identifications of various data sources) as compared to the freeform text found in calls from the chat-based interface 106, for example.

The SDS 110 can support multi-tenancy, allowing multiple clients to connect and interact with LLMs 199. Each client can have one or more sessions with the SDS 110, the sessions corresponding to sessions with an LLM 199. To do so, the SDS 110 can track, for a given session, the last N prompts sent to and responses received from the LLM in a memory such as in service data 115. The memory can be implemented as a moving window or circular buffer: as new prompts are sent and responses received, the SDS 110 deletes or overwrites the oldest entries. For a given session, the prompt and response engineering system 113 may embed all or a portion of the session memory in prompts submitted to the LLM by any of the agents 222. For example, if a session includes session history X and a new prompt P, the prompt and response engineering system 113 can submit concatenate P to X or to the most M most recent prompts and responses (where M<N) and submit the result of the concatenation to the LLM.

The SDS 110 can assign a session identifier to new sessions, allowing clients to pause and resume sessions. By referencing a session identifier upon connecting to the SDS 110, a client can return to an existing session. The SDS 110 can permit access to sessions based on a permissions policy associated with a principal account credential provided in establishing a connection to connect to the SDS 110. The credential may be associated with a user or group of an organization. The permissions policy can permit sharing of a session across different entities within the organization. For example, a first client may initiate a first session with the SDS 110 and receive a session identifier X. Later, a second client may resume the first session with the SDS 110 by providing the session identifier X, provided the credential provided when the second client established the connection to the SDS 110 is permitted to do so.

The prompt and response engineering system 113 can also monitor client text inputs over a session for certain session-management instructions. Such session-management instructions can be associated with various session-level operations. One example session-level operation is SESSION_RESET to reset a session, clear the memory associated with that session, and reset the associated session(s) with LLMs 199. Another example session-level operation is SESSION_CLOSE to close a session with the SDS 110 and any associated session(s) with LLMs 199.

The prompt and response engineering system 113 includes agents 122 and context aggregators 124. Agents 122 include various task-specific agents as well as other general agents that support SDS interactions with an LLM 199. Task-specific agents formalize various software development effort workflows, operating to expand user prompts, curate LLM responses, and provide the LLM with additional context often without user intervention. Context aggregators 124 retrieve additional data that agents can use to expand prompts or to otherwise provide to an LLM as conversation context to improve the relevance of LLM responses. The context aggregators 124 can retrieve the additional data from other cloud-based services, such as compute services 190, storage services 192, other services 194, etc.

Service data 115 can include data such as prompt templates, response definitions, user preferences, session state data, etc.

GAI models 197 include LLMs 199 and other models 198. LLMs are artificial intelligence systems designed to understand and generate human-like text. These models are trained using machine learning techniques, typically on vast amounts of text data from the internet, books, articles, and other sources. Often, LLMs use a type of neural network called a transformer to process and understand the patterns and structures of language. In some examples, the SDS leverages an LLM trained on the documentation of provider network services as well as application documentation and code examples of applications hosted by or that interface with services of the cloud provider network. The SDS can also leverage a more general-purpose LLM trained on a larger variety of texts. Other models 198 can include code generation models, which may be within the same family as LLMs but trained and/or fine tuned on a corpus more narrowly curated to software development documents (e.g., application code, comments, documentation, programming books, etc.) rather than general texts encompassing a range of other fields. A code generation model used to generate code for an SDS as described herein can include a reference tracker or origin tracker feature, which can identify when outputs of some threshold size (e.g. line(s) of code, number of words/tokens) are similar to or the same as instances of its training data and then provide metadata about that training data (e.g., author, license terms such as an open source license, link to original source repository) to the user. The SDS can receive such metadata and display it to the user so that the user can decide whether they would like to accept or modify the code suggestion or ask for a different generated suggestion.

In the illustrated example, the SDS 110 further includes an SDS user interface controller 114. The SDS UI controller 114 can manage interactions between the SDS 110 and a user interface such as the chase-based interface 106 or canvas 107 (e.g., to render a graphical view of a software system), interactions between the user interfaces 106 and 107 (e.g., to reflect chat-based inputs on the canvas or vice versa), and interactions between agent results and the user interfaces (e.g., to display the recommended changes associated with an LLM output on the canvas 107). Additional details regarding the SDS UI controller 114 are illustrated and described at least with reference to FIG. 20.

Figure 2:
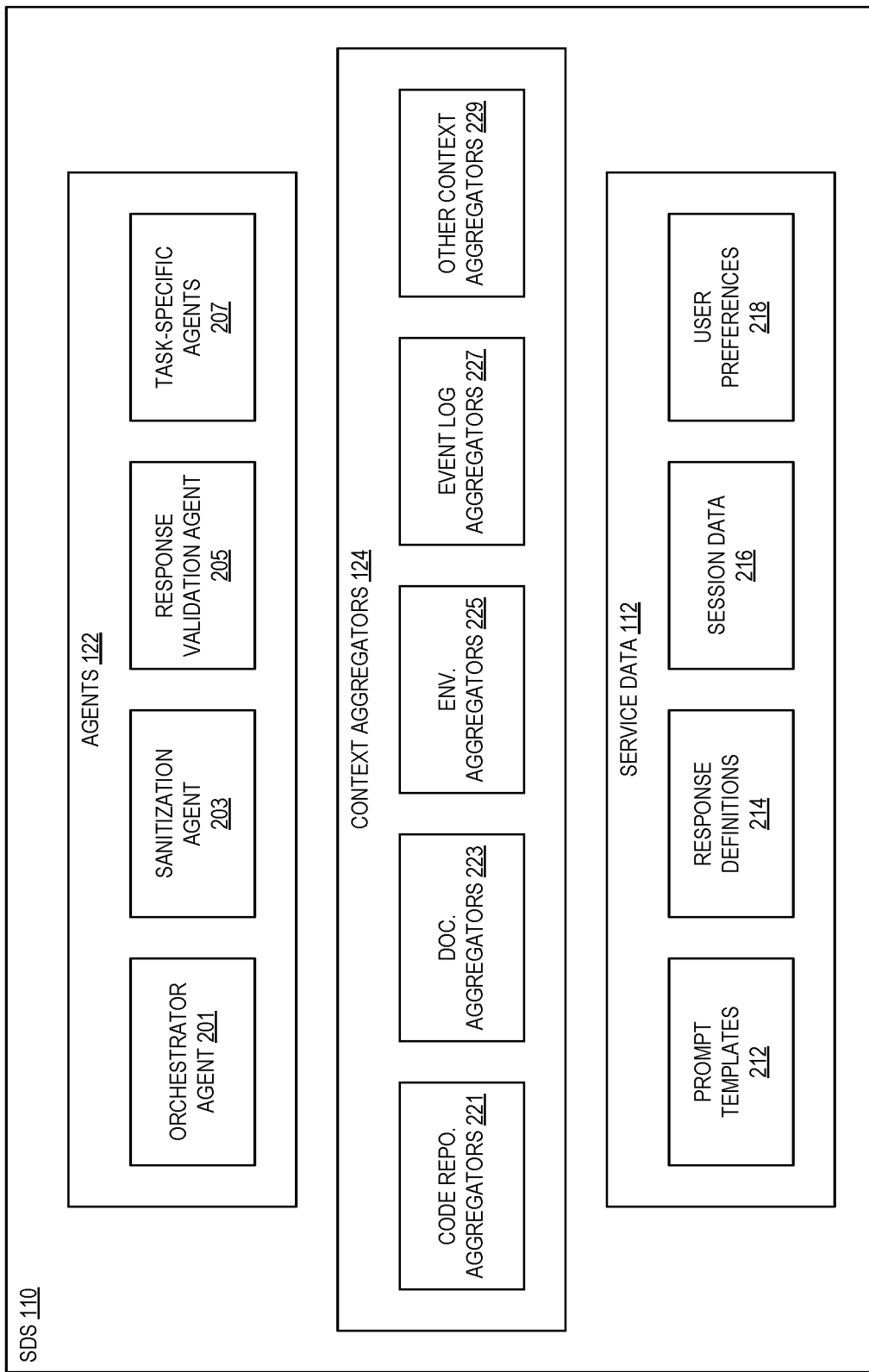
FIG. 2 depicts additional details of a software development service according to some examples.

FIG. 2 depicts additional details of a software development service according to some examples. Agents 122 include various task-specific agents as well as other general agents that support SDS interactions with an LLM 199. Example general agents include an orchestrator agent 201 that can manage a session with a client, a sanitization agent 203 that can ensure prompts and responses are within the scope of various tasks or do not venture into sensitive or objectionable material, and a response validation agent 205 that can evaluate LLM responses against expected results.

In some examples, the orchestrator agent 201 can be the default agent executed upon connection by an application to the SDS 110 with a chat-based interface. Depending on the initial user prompt, the orchestrator agent 201 can identify the task requested to be performed and invoke the associated task-specific agent. The orchestrator agent 201 leverages an LLM to determine whether a given prompt falls within a supported set of tasks and to identify which task-specific agent should be invoked.

In some examples, the sanitization agent 203 reduces the likelihood of the LLM providing objectionable or off-topic responses. Such responses may be artifacts of the LLM operations, resulting in what are sometimes referred to as "hallucinations." Having received a response, a sanitization agent can prompt the LLM (or another LLM, or another instance of the LLM without a saved context) with questions related to the nature of the response, such as to test whether the response contains objectionable material, whether the response is related to the expected field of use (e.g., software development).

In some examples, the response validation agent 205 (or "validation agent") verifies that an LLM response conforms with the response definition of the preceding prompt. The response validation agent can perform a variety of validations. Example validations include prompting the LLM (or another LLM, or another instance of the LLM without a saved context) with a question as to whether the received response conforms with the response definition of the previous prompt, testing whether the downstream software that processes the response can successfully it (e.g., parsing the response in a try-catch statement), and, in the case of code, executing the code in an isolated environment such as a sandbox.

Example task-specific agents include agents that assist clients with a given task. For example, a system design agent can assist a client in gathering additional information to provide to the LLM to improve the LLM's response to a software development task, a development task agent can assist a client dividing a development task into sub-tasks or actions, and an error resolution agent can assist a client with error or bug troubleshooting. In some examples, the interface 111 of FIG. 1 can support requests that invoke a particular task-specific agent without relying on the orchestrator agent 201. For example, one API call can invoke the system design agent, another can invoke the development task agent, and another can invoke the error resolution agent.

Context aggregators 124 gather context about a given software system's environment to be provided to an LLM as part of the prompt expansion operations of the SDS 110. Such additional data can range from general documentation applicable to a prompt to specific source code associated with a given component of the software system. Agents 122 can invoke context aggregators, in some cases depending on a previous response from an LLM identifying which additional context would assist it in generating a response. Using the information obtained from the invoked context aggregator(s), agents 122 can provide at least some of that information as additional context in subsequent prompts sent to the LLM.

Some context aggregators can retrieve information from other cloud-hosted services of a provider network or other reachable sources (e.g., sources with public facing APIs external to the provider network). One example of such information is source code and configuration data, which can provide relevant context to an LLM. Another service 194 of the provider network 100 may be a code repository service that stores source code, documentation, and other configuration data in repositories for various client applications. A code repository aggregator 221 can access the code repository service to obtain source code and/or configuration data associated with various components of an identified software system.

In some examples, context aggregators retrieve information about a particular software system. Such may be the case when a client of the SDS 110 has engaged it for a task associated with an existing system. The client can provide references to the various cloud-hosted services that include details about the system to the SDS 110, and the context aggregators can retrieve that data. In other examples, context aggregators retrieve information about other software systems owned by or otherwise accessible to a principal-typically the identity that was used to authenticate a client. The principal may be a user, group of users, organizational unit within a business, etc. The SDS 110 can leverage context aggregators to retrieve details about the other systems of the principal.

Often environmental parameters can have an effect on software program operations. Such environmental parameters can extend from the particulars of the operating system environment variables in which the application is running to the overall cloud-based environment, the latter particularly so when the application is hosted in a provider network. For example, another service 194 of the provider network 100 may be a permissions service (e.g., an identity and access management service). Such a permissions service can include policies that define the various actions that principals can take or that various actions that can be taken upon hosted resources, thus impacting application execution. An environment aggregator 225 can access the permissions service to obtain permissions data associated with an identified software program.

Logged events and/or errors can also provide context regarding a development task, particularly when troubleshooting bugs or other errors. Another service 194 of the provider network 100 may be a logging service in which events, errors, and other types of activity related to applications executing in the cloud are recorded. An event log aggregator 227 can access the logging service to obtain logs associated with an identified software system.

General documentation related to a service or API can also provide useful context without being specifically associated with a particular application or user. Other types of more specific documentation can also be helpful. Such documentation can include software project descriptions, software documentation, source code files, ticketing systems, and the like from other public software programs or systems. Another service 194 of the provider network 100 may be a documentation services that stores such documentation. A documentation aggregator 223 can use Retrieval Augmented Generation (RAG) techniques to identify documents of "relevance" to a given task. Initially, each of the available documents with the documentation service can be encoded as an embedding, those embeddings stored in a database. When invoked, the documentation aggregator can 223 use the encoder to generate an embedding from user text for the given task. The document aggregator 223 can then identify relevant documents based on the distance between the task embedding and document embeddings in the database, selecting the N nearest document embeddings, document embeddings within some distance threshold, or some other criteria to identify documents having embeddings in proximity to the task embedding. The documentation aggregator 223 can then access the documentation service to obtain the documents associated with those selected embeddings.

Other context aggregators 229 may generate annotated context from data obtained by other context aggregators. For example, some context aggregators can compile and annotate data retrieved by other aggregators into a summary. Such a context aggregator can indicate, for each of the other context aggregators that retrieved data or other information, a description of the source of the information. As another example, some context aggregators may generate structural summaries of a software system. Cloud-hosted software systems are often structured as a collection of interacting services with user code running on various resources to coordinate those interactions. A system map (or "architectural map" or just "map") can describe the structure of a software system. The structure can include details like programs, the cloud-level infrastructure or resources on which those programs are executed, the interconnection of those programs through various data transfers (e.g., API calls, passing JSON objects, etc.), environmental configuration data (e.g., environment variables available to the programs, variables that configure the resources on which programs execute, etc.), network-level configuration data (e.g., VPC configuration data, configuration data of virtual network components like routers or gateways, etc.). In some examples, a system map of the structure of a software system may have been previously defined (e.g., by the developer). In other examples, a system map context aggregator can generate a system map that provides a description of the software system. Additional details on the system map context aggregator are illustrated and described with reference to FIG. 3.

Service data 112 can include templates 212, response definitions 214, session data 216, and user preferences 218. Templates 212 can include prompt templates that provide additional text cues beyond what might otherwise be provided by a user. For example, a user might provide a prompt such as "what is causing error X?" A prompt template can encapsulate the user's prompt with various cues that improve the quality of the response of the LLM. One pattern used by agents associated with various tasks described herein is a template to prompt the LLM to ask questions (e.g., "You will be asked to respond to the following prompt: 'what is causing error X?' What information would assist you in your response?"). Prompt templates can be used to expand prompts received from various clients (a human user typing a software error into an issue tracking system that later submits an API call to the SDS is likely to use the same abbreviated language as a human user typing an error into a chat session with an LLM). Templates 212 can also include response templates for responses to be sent to clients, populated with data received from the LLM.

Response definitions 214 define how the SDS 110 will expect the response from the LLM to be formatted. Response definitions 214 can be used to regularize the responses from LLMs to improve the ability of the SDS 110 to parse those responses such that they can be stored, trigger follow on actions, etc. Example response definitions include instructing the LLM to respond in natural language forms such as with a Yes or No, a list of items, an enumerated list of items, etc. and also to respond with more structured forms (e.g., with Python code, with an SQL query, with a JSON object, etc.) Note that the interpretation of responses pursuant to response definitions is typically contingent on the phrasing of a prompt, tailored within a given agent (e.g., a negative response might indicate a pass for one prompt, a failure for another).

Session data 216 can include the historical dialogue with an LLM, as mediated by the SDS. Not all prompts that the SDS 110 submits to an LLM 199 originate from a client, nor does the SDS 110 send all responses from the LLM 199 to the client. For this reason, the session data can include metadata about LLM interactions (e.g., whether a prompt originated from the SDS 110 or a client, whether a response from the LLM was sent to a client).

User preferences 218 can include stored user preferences based on prior dialogs with a client. In particular, the system design agent can elicit information from the client regarding preferences. Such preferences can include things such as preferred programming language (e.g., to instruct the LLM when requesting code suggestions), preferred compute options for cloud-hosted applications (e.g., whether a virtual machine, container, serverless function, etc.), permissions preferences (e.g., whether a certain set of principals can access the application), etc.

While not shown, the service data 112 can include other data such as the types of tasks the SDS 110 can support (typically those associated with the available task-specific agents) as well as the types of additional information or context that can be gathered (typically associated with the available context aggregators).

Figure 3:
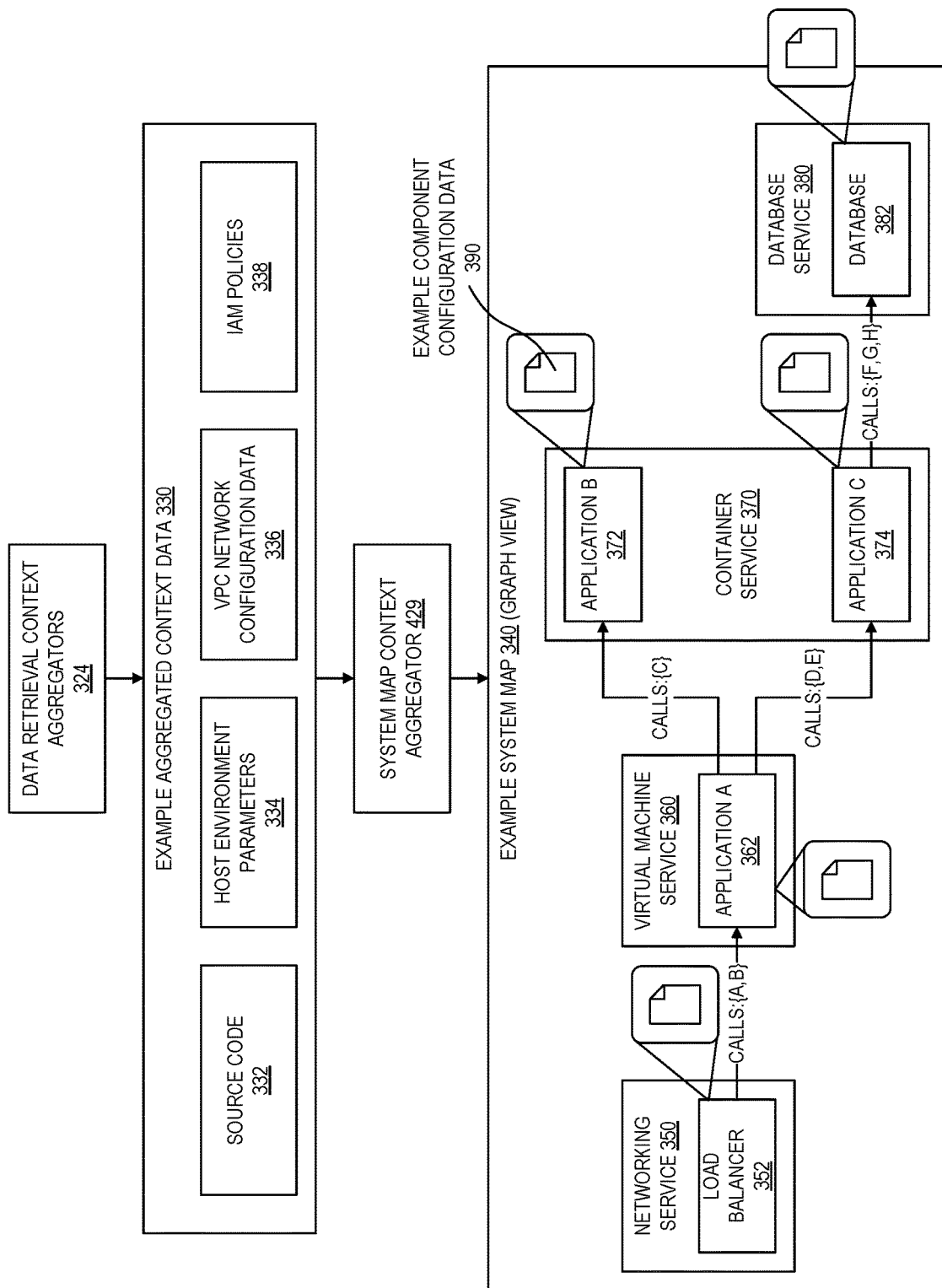
FIG. 3 depicts details of a system map context aggregator according to some examples.

FIG. 3 depicts additional details of a system map context aggregator according to some examples. A system map context aggregator 229 can analyze the information collected by various data-gathering context aggregators 324 (e.g., aggregators 221, B23, 225, 227, etc.) to identify components of a software system as well as the dependencies amongst those components. The system map context aggregator 229 can generate a map, typically specified in a structured language format describing the components such as resources and mappings between resources. Common formats for the map include JSON, YAML, UML, etc. In an example map, each component can include an identification and description of the APIs it vends as well as an identification of the APIs it calls. Thus, a component vending an API "product_order( )" would be a dependency to other components making calls to that API. The components can further include or reference the network policies that control the types of traffic that can be sent to or from the component. For components executed by a resource (e.g., containers, virtual machines, serverless functions, etc.), the map can include or reference the environmental parameters associated with an instance of that component. For data sources and sinks, the components can include a description of their formats (e.g., a schema for databases hosted by a database service).

An example graphical view of a system map 340 is illustrated. Components 352, 362, 372, 374, 382 are interconnected via API calls A through H as shown. Each component has an association with a service of the cloud provider network—for example the database 382 is hosted by a database service 380 of the provider network (e.g., another service 194). Each component also has a component configuration data 190, such as permissions policies, network policies, environmental configuration data, etc.

FIG. 4 depicts example templates and response definitions according to some examples. Example prompt templates 412 include a troubleshooting prompt template and a project design prompt template. Example prompt templates 412 provide additional cues to an LLM about the scope and/or performance of various tasks. Prompt templates can include placeholders that can be populated with custom text, typically offset from the prompt text by special characters and identified by a variable name (indicated by braces surrounding a variable name in this and subsequent figures). In using a prompt template, agents 122 populate the placeholders prior to submitting the resulting prompt to an LLM. For example, the troubleshooting prompt template includes a placeholder 402 for a user prompt, a placeholder 404 for an identification of data sources that the LLM has at its disposal, and a placeholder 406 for a response definition that describes the form of the expected response. Prompt templates can also be used for messages sent to a user (e.g., to wrap additional context around a response or responses from an LLM).

Example response definitions 414 include, in prose, descriptions of how an LLM should respond to a particular prompt. The illustrated examples include descriptions of a "yes or no" response, a response including only a set of bulleted items, a response including a set of numbered items, and a response including only a set of numbered items. A validation agent can leverage the response definition associated with an LLM prompt (or prompt template) and the associated response to perform various operations that evaluate the suitability of the response for continued SDS 110 operations (e.g., whether the SDS 110 can parse the response).

Figure 5:
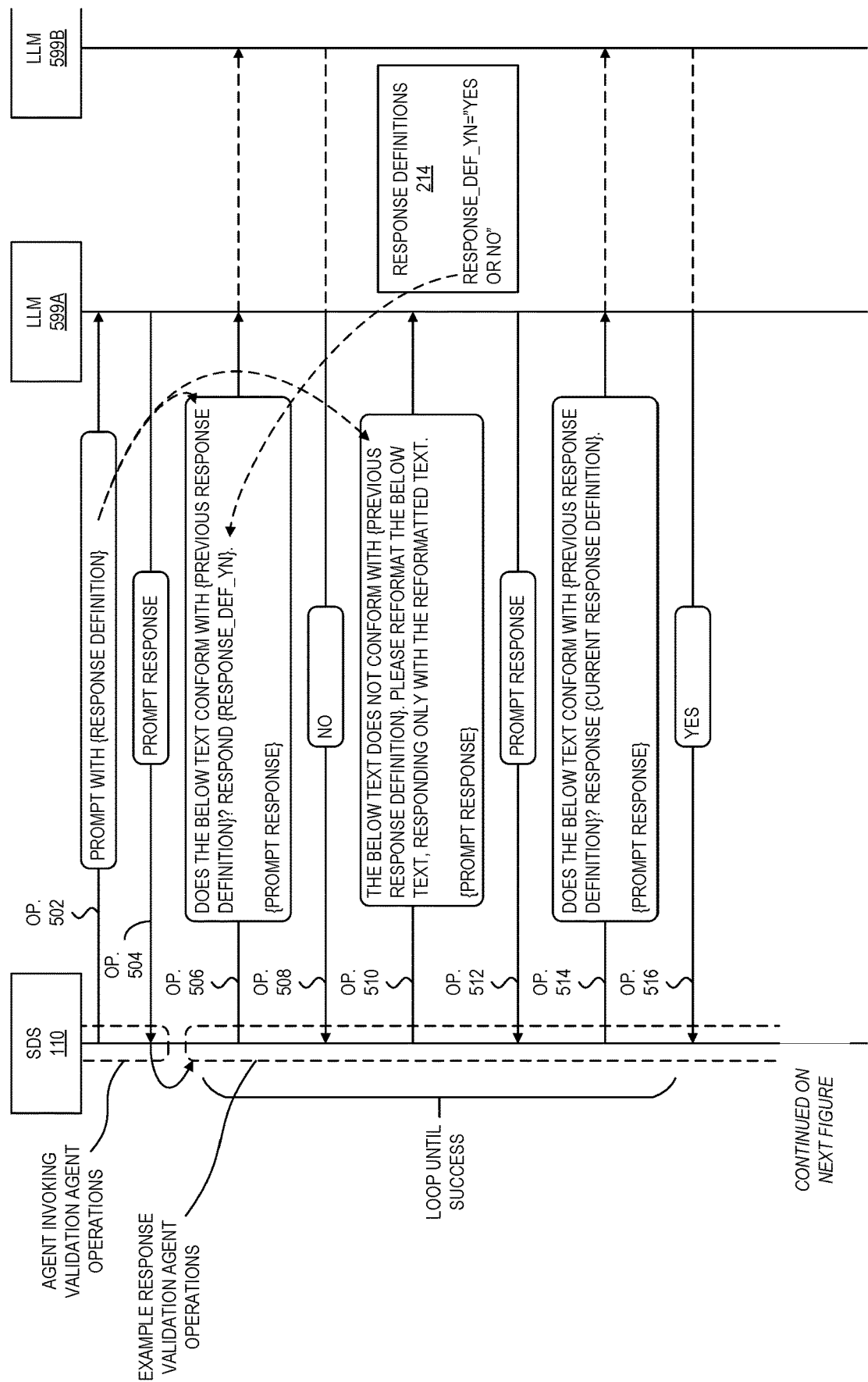
FIGS. 5 and 6 depict example operations of a validation agent according to some examples.
Figure 6:
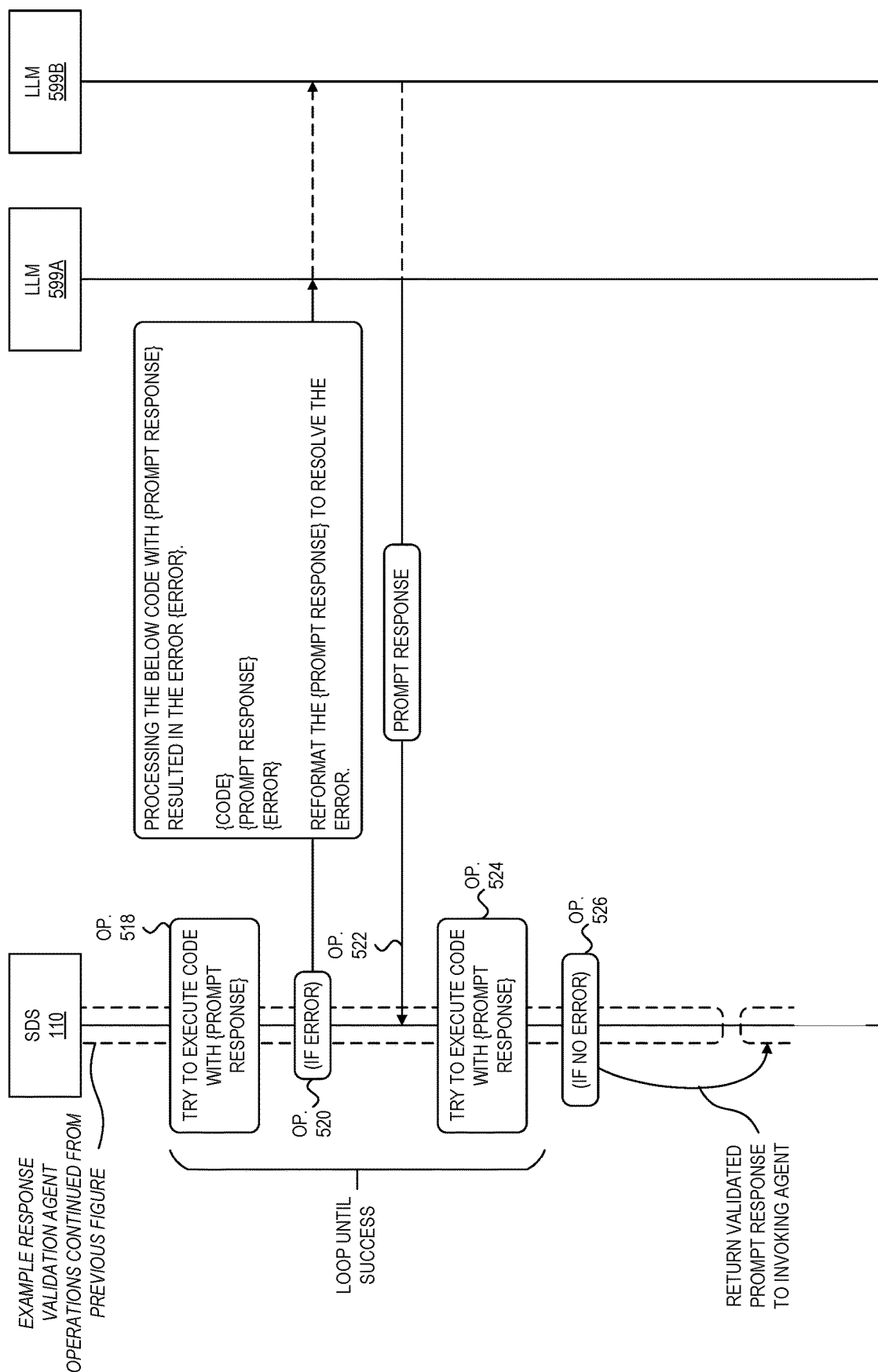

FIGS. 5 and 6 depict example operations of a validation agent according to some examples. A validation agent such as the validation agent 205 can be called by other agents as needed to review the correctness of an LLM-generated responses against response definitions. Initially, at operation 502, a task agent invoking a validation agent can send a prompt with a response definition to an LLM 599A. At operation 504, the task agent can receive a response to the prompt and invoke the validation agent.

The example operations of the validation agent can be broadly categorized as LLM-based validations (i.e., using an LLM to validate an LLM response) and execution-based validations (i.e., attempting to execute code using an LLM response). To illustrate LLM-based validations, at operation 506, the validation agent sends a prompt including the response and prompt definition, the prompt inquiring whether the response complies with the response definition. Note that the interactions of the validation agent can be with the same LLM 599A that generated with the response or with a different LLM 599B (such as when the LLMs provide different levels of performance on given tasks).

At operation 508, the validation agent receives a response to the LLM-based validation prompt. At operation 510, given the negative response at operation 508, the validation agent sends a response correction prompt to the LLM 599A that generated the previous response that failed the validation, the response correction prompt to reformat the prior response. (In other examples, the validation agent can send a response correction prompt to another LLM such as the LLM 599B.)

In some examples, given a response indicating a previous response did not comply with a response definition, the validation agent can prompt the queried LLM to provide an explanation, which can be included in the response correction prompt (e.g., at operation 910).

At operation 512, the validation agent receives an updated prompt response from the LLM 599A. At operation 514, the validation agent sends a prompt like the one of that of operation 506. As indicated, the validation agent can loop through the LLM-based validations until an affirmative response is received from the LLM validator, such as at operation 516. In some examples, the validation agent maintains a count of the number of passes through the LLM-based validation loop and returns an error when that number exceeds a threshold.

Having completed the LLM-based validations, the validation agent can proceed to execution-based validations. Continuing on FIG. 6, at operation 518, the validation agent attempts to execute code using the prompt response. The code used in the execution attempt can be in the form of an application developed to exercise a prompt response given a particular response definition. The executed validation agent can determine the code to execute based on the previous response definition. The code can generate no output or effect no changes or can be executed in sandbox-type environment.

If the code execution fails, at operation 520, the validation agent sends a prompt including the code, the prompt response (e.g., from the LLM-validation operations), and/or the error to the LLM 599A or 599B to prompt the LLM to correct the prompt response. At operation 520, the validation agent receives the updated prompt response.

At operation 524, the validation agent performs another attempt at executing the code with the prompt response. As indicated, the validation agent can loop through the execution-based validations until the code executes without error, causing the validation agent to return the validated prompt response to the invoking agent, as indicated at operation 526. In some examples, the validation agent maintains a count of the number of passes through the execution-based validation loop and returns an error when that number exceeds a threshold.

Prompts sent at operations 506, 510, 514, and/or 520 can be based on prompt templates in templates 212.

Validation agent and/or sanitization agent (described below) operations can be performed on responses 508, 512, 516, and/or 522 (note that the response definitions in the preceding prompts are not always expressly identified in the figures). In some examples, some or all of the validations that would otherwise take place on responses to validation prompts (e.g., to operations 506, 514) can be omitted, relying on the LLMs high degree of performance on well-defined tasks (e.g., answering "yes or no" prompts).

A validation agent can be invoked by other agents anytime the other agent receives a response from the LLM based on a prompt that included a response definition.

Figure 7:
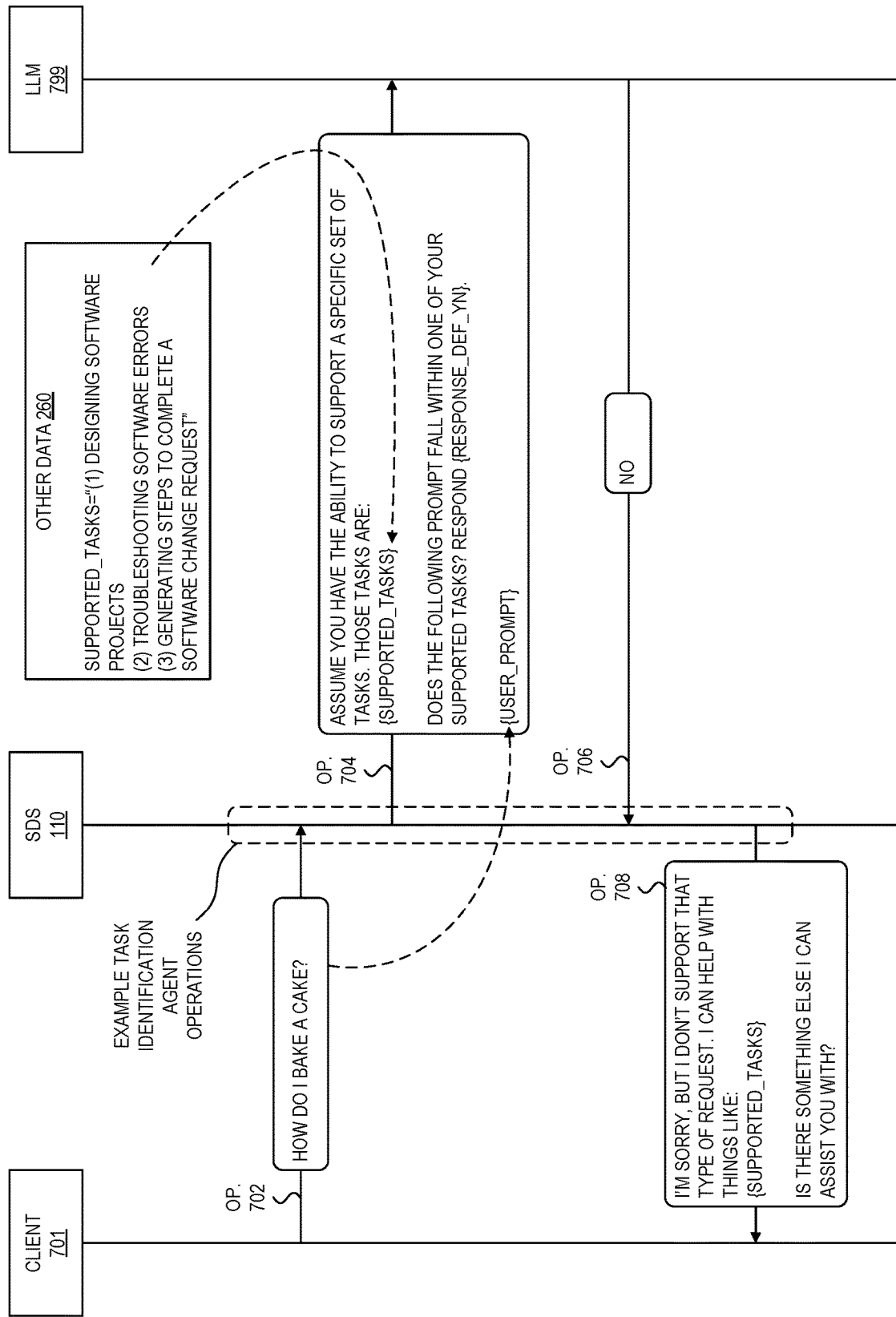
FIGS. 7 and 8 depict example operations of an orchestrator agent according to some examples.
Figure 8:
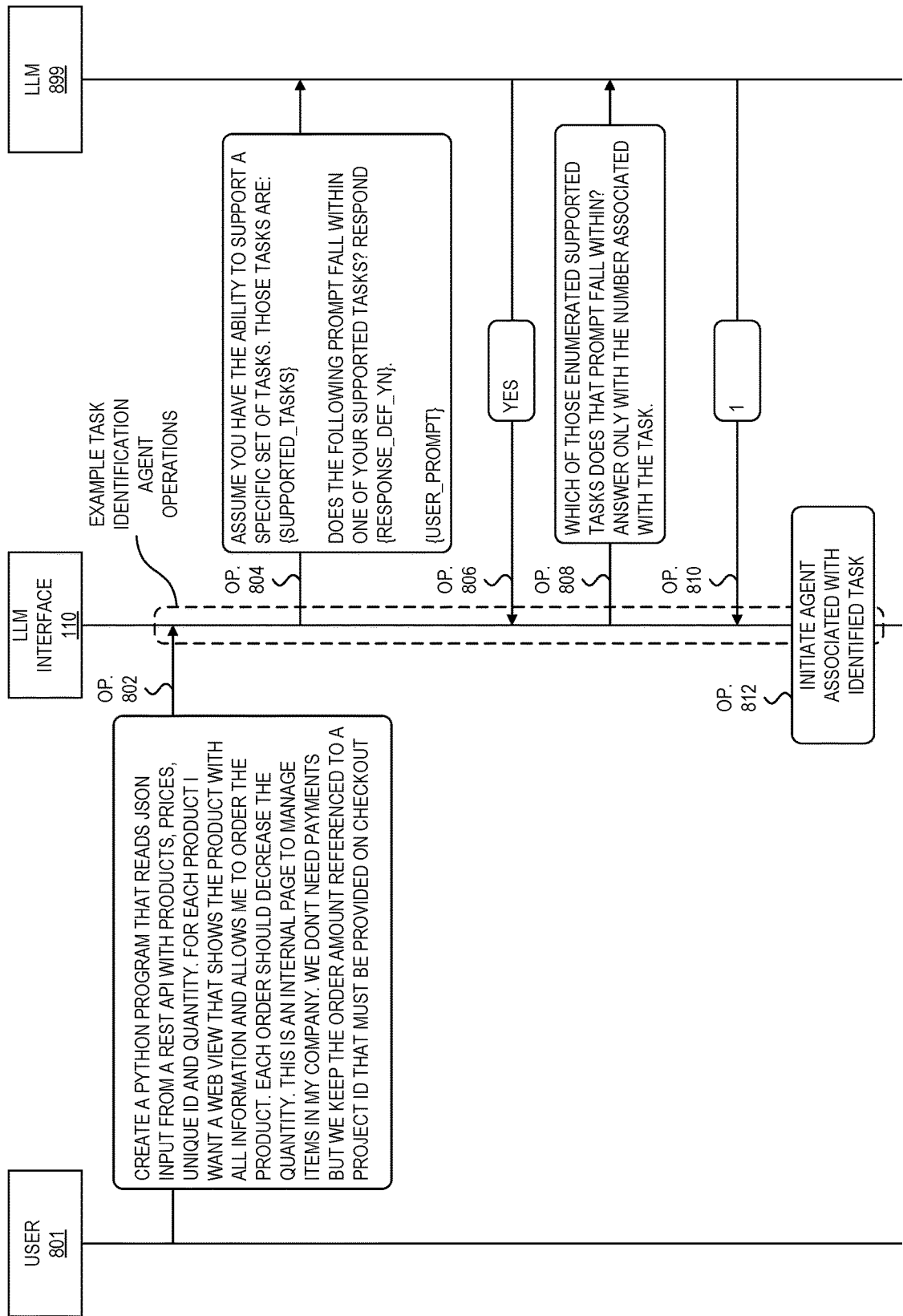

FIGS. 7 and 8 depict example operations of an orchestrator agent according to some examples. An orchestrator agent such as the orchestrator agent 201 serves to identify other task-specific agents 207 to be executed. FIG. 7 depicts example operations of an orchestrator agent processing a prompt including unsupported task. At operation 702, the orchestrator agent receives a prompt from a client 701. At operation 704, the orchestrator agent sends a prompt to an LLM 799 inquiring whether the included client prompt falls within a set of supported tasks, the set of supported tasks defined in other service data 760 (e.g., as part of service data 115). At operation 706, the orchestrator agent receives a negative response from the LLM 799. At operation 708, given the negative response at operation 706, the orchestrator agent sends a response to the client prompt indicating that the request appears to be unsupported.

FIG. 8 depicts example operations of an orchestrator agent processing a prompt including a supported task. At operation 802, the orchestrator agent receives a prompt from a client 801. At operation 804, the orchestrator agent sends a prompt to an LLM 899 inquiring whether the included client prompt falls within a set of supported tasks. At operation 806, the orchestrator agent receives an affirmative response from the LLM 899.

At operation 808, given the affirmative response at operation 806, the orchestrator agent prompts the LLM 799 to identify the task that the client prompt falls within. At operation 810, the orchestrator agent receives a response including an identification of the task associated with the client prompt (which can be validated using a validation agent provided the prompt at operation 806 included a response definition). At operation 812, the orchestrator agent initiates the agent associated with the identified task (e.g., a system design agent, a development task agent, and error resolution agent, etc.).

Prompts sent at operations 704, 804, and/or 808 can be based on prompt templates in templates 212. The response sent at operation 708 can be based on a response template in templates 212.

Validation agent and/or sanitization agent (described below) operations can be performed on responses 508, 512, 516, and/or 522 (note that the response definitions in the preceding prompts are not always expressly identified in the figures).

Figure 9:
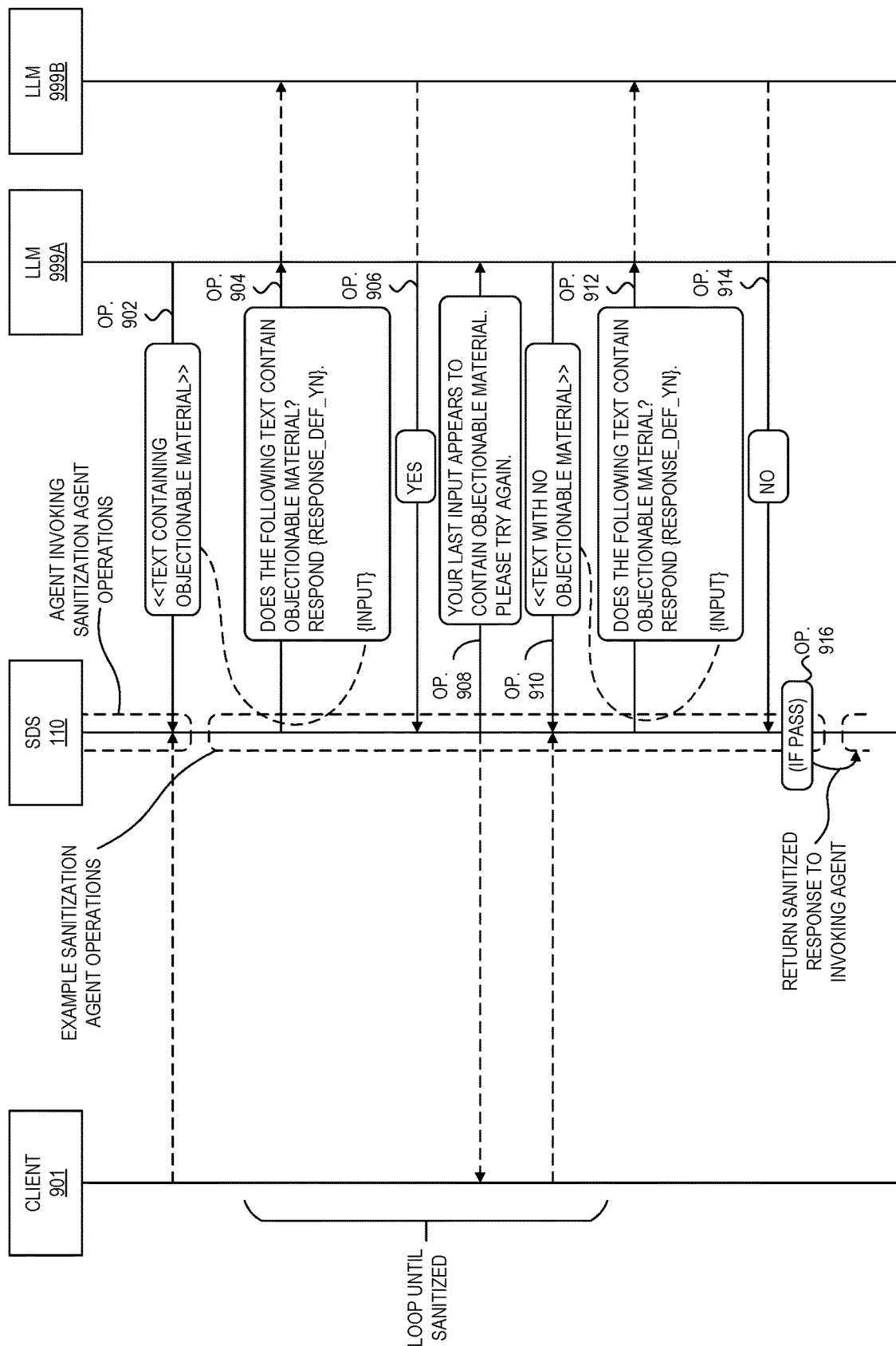
FIG. 9 depicts example operation of a sanitization agent according to some examples.

FIG. 9 depicts example operation of a sanitization agent according to some examples. A sanitization agent such as the sanitization agent 203 can be called by other agents as needed to review the scope and/or content of an LLM-generated response or even client-submitted text. At operation 902, an agent invoking a sanitization agent receives text from an LLM 999A. Here, the text is assumed to include objectionable or sensitive material. At operation 904, the sanitization agent sends a prompt to the LLM 999A inquiring whether the text, received from the invocation agent, contains sensitive material. In this example, the prompt includes a "yes/no" response definition.

At operation 906, the sanitization agent receives an affirmative response from the LLM 999A indicating that the text contained sensitive material. At operation 908, given the affirmative response at operation 906, the sanitization agent prompts the LLM 999A to rephrase its last response. In some examples, given a response indicating a text included objectionable material, the sanitization agent can prompt the LLM 999A to provide an explanation of the analysis, which can be included in the prompt to rephrase a response (e.g., at operation 908).

At operation 910, the sanitization agent receives text from an LLM 999A. Here, the text is assumed to be rephrased such as to not include objectionable or sensitive material. At operation 912, the sanitization agent sends a prompt to the LLM 999A like the one of operation 904. At operation 914, the sanitization agent receives a negative response from the LLM 199A indicating that the text did not contain sensitive material. As indicated, the sanitization agent can loop through the operations 904 through 910 until an acceptable response is received to the sanitization prompt, such as at operation 914. At operation 916, the sanitization agent returns the sanitized text to its invoking agent.

As indicated by the dashed lines between the client 901 and the SDS 110 at operations 902 and 908, the sanitization agent can perform operations on text received from the client and can prompt the client to rephrase questionable text.

As indicated by the dashed lines to and from an LLM 999B, the sanitization agent can vet texts with an LLM other than the one that generated the response under evaluation. Doing so can avoid increasing the amount of off-task context is stored with the session state or leverage a differently trained LLM than the one that generated the response under question.

Prompts sent at operations 904, 908, and/or 912 can be based on prompt templates in templates 212 (possibly based on a response template if the rephrase request is sent to the client 901). A sanitization agent can use other prompt templates to ask an LLM other types of questions, such as a "scope" prompt to question whether a text includes material unrelated to the use case (e.g., software development, etc.). The sanitization agent can use the scope prompt template in operations such as those described above for prompt template used to detect objectionable material (e.g., repeating operations 904 through 914 but with the scope prompt template to test for out-of-scope text).

Validation agent operations can be performed on responses 906, 914 (note that the response definitions in the preceding prompts are not always expressly identified in the figures).

A sanitization agent can be invoked by other agents anytime the other agent receives an input (whether from an LLM or a client).

Figure 10:
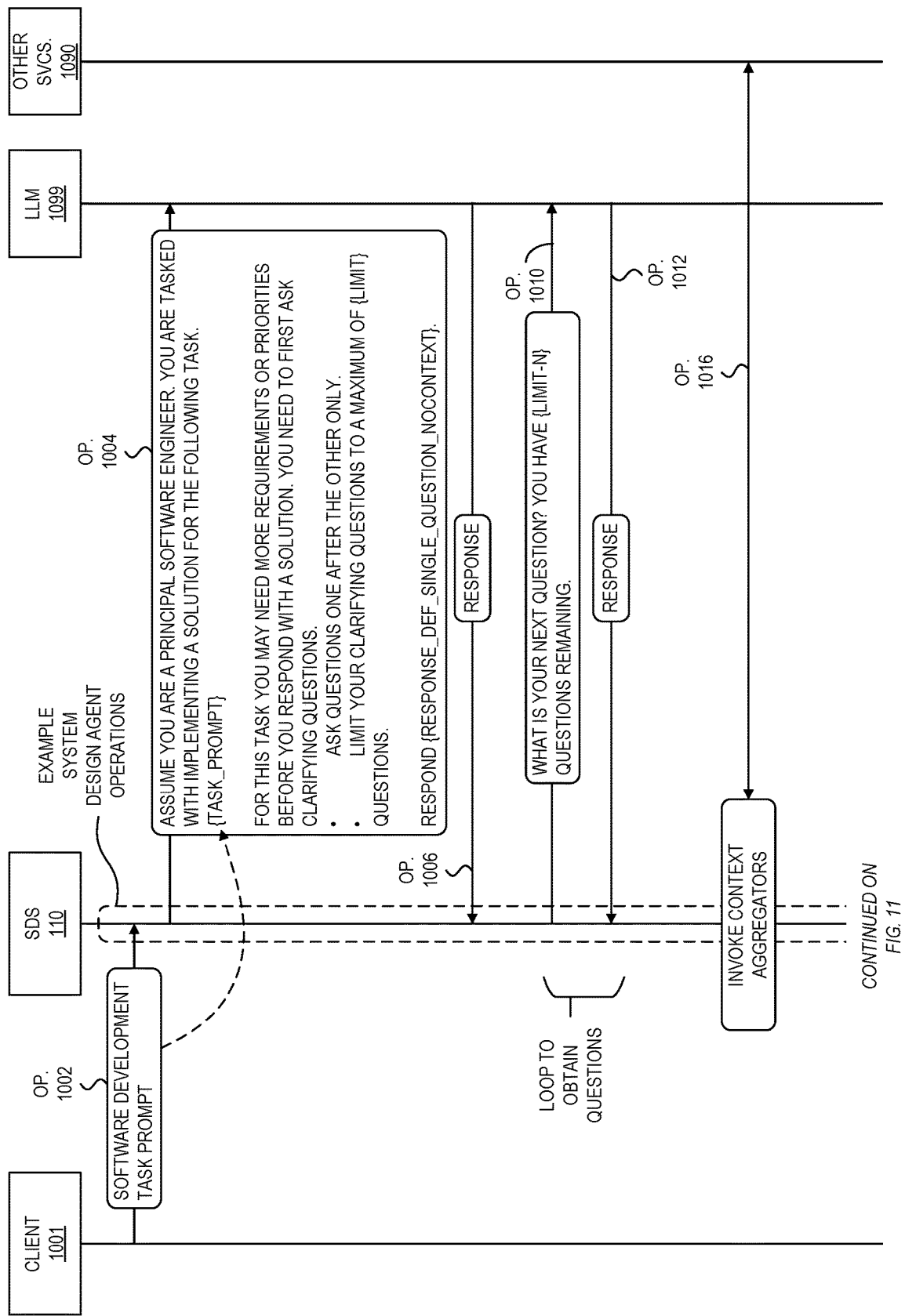
FIGS. 10 and 11 depict example operations of a system design agent according to some examples.
Figure 11:
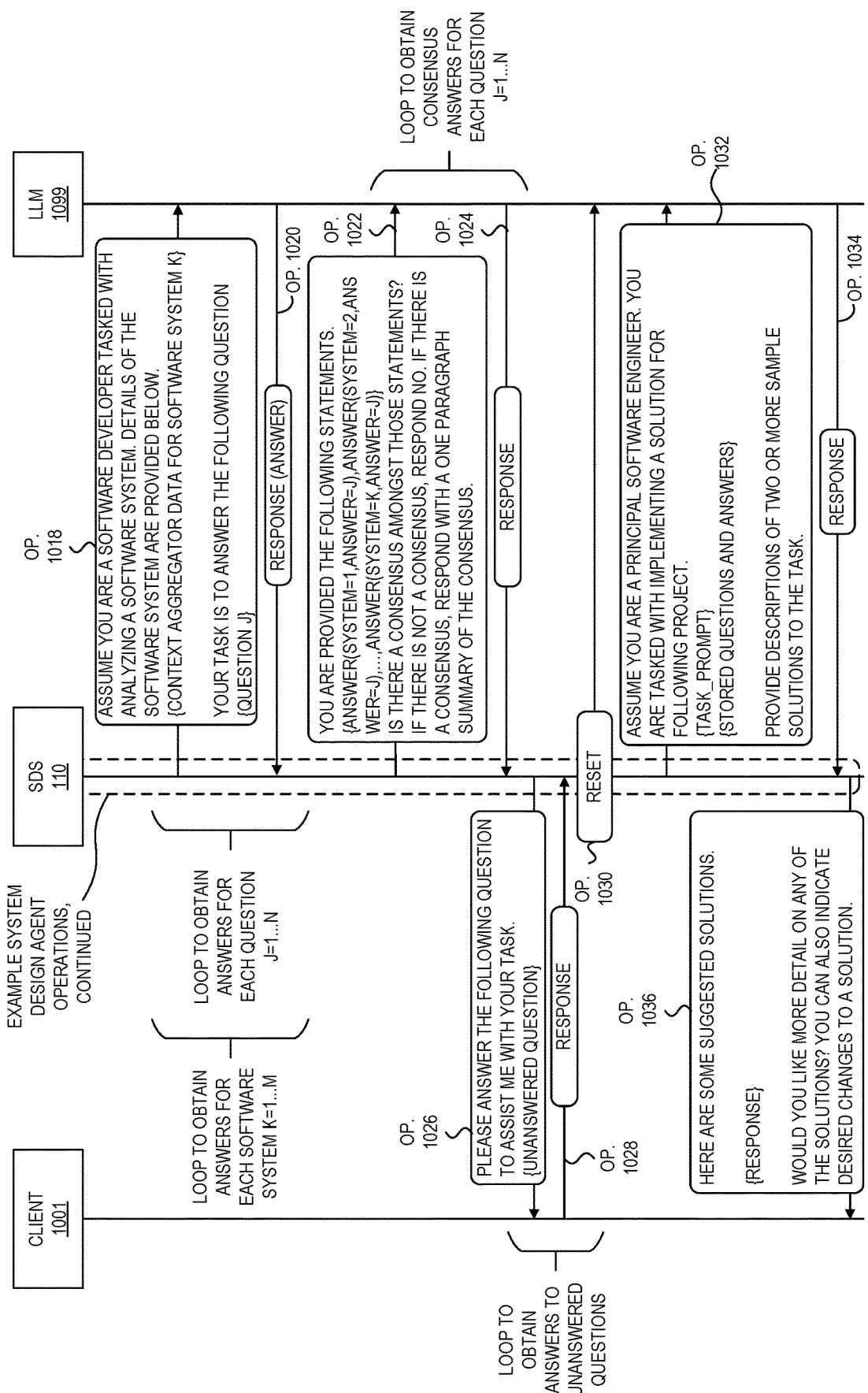

FIGS. 10 and 11 depict example operations of a system design agent according to some examples. A system design agent can improve LLM responses to software development tasks by providing additional information to the LLM. By gathering and providing additional information to the LLM, the system design agent can obtain details regarding design considerations such as particular preferences, requirements, priorities, trade-offs, and the like to further frame an LLM conversation to improve LLM-recommended task solutions. At a high level, the system design agent prompts the LLM to generate clarifying questions prior to providing recommended solutions to a task. The system design agent can then gather information about various software systems of the client and use that gathered information to answer the clarifying questions. In some examples, if a question remains unanswered, the system design agent can pass the question to the client. Using the gathered information, the system design agent can respond to the task. For example, at operation 1002, the system design agent receives a prompt from a client 1001 (by way of an orchestrator agent, for example), the prompt including a task prompt (typically in the form of a description of a software design task).

At operation 1004, the system design agent sends a prompt including the task prompt to an LLM 1099, the prompt requesting a set of clarifying questions related to design considerations of the task (e.g., requirements, priorities, preferences, etc.). The prompt can include an instruction to limit the number of questions to a threshold. In some examples, the limit may be a fixed threshold (e.g., based on empirical data related to the performance of the agent). In other examples, the system design agent may query the LLM to determine how many questions it estimates would scope the design considerations. If the LLM's response is over a threshold, the system design agent may limit the number of questions to that threshold. Otherwise, the system design agent can limit the number of questions to that estimated by the LLM. In other examples, the system design agent may prompt the client for the limit and set the limit in the prompt to the client-specified limit.

In this example, the system design agent prompts the LLM 199 for the questions one at a time. At operation 1006, the system design agent receives a response from the LLM 1099 and stores it as a question. If there is more than one question, the system design agent continues to accumulate the questions. For example, at operation 1010, the system design agent prompts the LLM 1099 for the next question, the prompt including an indication on the number of questions remaining (assuming the limit has not been reached). At operation 1012, the system design agent receives a response from the LLM 1099 again stores it as a question. As indicated, the system design agent continues to obtain questions from the LLM 1099 until the limit has been reached. In other examples, the system design agent can prompt the LLM 1099 for a complete set of questions rather than obtaining them sequentially.

The system design agent attempts to answer the questions using tools at its disposal before soliciting additional information from the client. To do so, at operation 1016, the system design agent invokes one or more context aggregators. The context aggregators can be invoked to obtain information about software systems associated with the client principal. The client principal is the identity that the client used to authenticate with the SDS 110. The principal may have permissions (via user, group, role, organizational unit, etc.) to access data about one or more other software systems hosted by the provider network. For example, that data can include source code repositories, network policies, permissions policies, etc. for various software systems. Using the various context aggregators 124, the system design agent can gather data about the principal's software systems. The data for each of the software systems may be different depending on the principal's permissions. For example, for software system A, the system design agent may obtain network and permissions policies, while for software system B, the system design agent may also obtain source code. Using the context aggregators 124, the system design agent can gather data about software systems 1 through M.

The system design agent next attempts to answer the questions about the task using the obtained data. At operation 1018, the system design agent prompts the LLM 199 to evaluate a question J given the obtained context about a system K. At operation 1020, the system design agent receives the LLM's answer. As indicated, the system design agent can loop through each of the questions J=1 . . . N and each of the software systems K=1 . . . M, building a set of answers to each question in the set of questions obtained at operations 1006, 1012.

Various approaches can be used to infer answers to the questions received at operations 1006, 1012 based on the answers received at operation(s) 1020. Some approaches can rely on consensus, such as when there are multiple other software systems that have been evaluated. Under a consensus based approach, at operation 1022, the system design agent prompts the LLM 199 to indicate whether a consensus to the answers for a given question across the various software systems K. At operation 1024, the system design agent receives the response from the LLM. As indicated, the system design agent can determine whether consensus exists for each of the J questions. If consensus does not exist for a given question, the system design agent can treat the question as unanswered. As another example of a consensus based approach, the LLM 199 can be prompted some number of times (for example 3, 5, or more) to generate a response and a similarity analysis can be performed to determine whether the responses generally agree with one another. For example, the LLM 199 can be asked to identify whether the responses agree or whether there are any significant differences (e.g., architectural differences, different programming languages for generated code, different actions in an action list, and the like) between the responses. If the former, this is a signal that the LLM has enough information to generate a suitable output. If the latter, the topics on which differences occur can be treated as unanswered questions, and the LLM 199 may be asked to generate a clarifying question to the user based on identified differences. In yet other examples of a consensus based approach, some number of LLMs (for example 3, 5, or more) can be independently prompted to generate responses and a similarity analysis can be performed to determine whether the responses generally agree with one another, such as described above.

At operation 1026, the system design agent prompts the client with the unanswered questions (e.g., those questions which have negative consensus). At operation 1028, the system design agent receives a response (e.g., an answer) from the client 1001. Again, the system design agent can loop through each of the unanswered questions.

Other approaches can rely on confidence scores to identify unanswered questions, such as when a single software system was evaluated. For example, the system design agent can request a confidence score in a prompt such as prompt 1018. If the confidence score satisfies a threshold, the system design agent can treat the question as answered (e.g., on a scale from 1 to 10 where 1 is not confident and 10 is extremely confident, with a threshold of greater than 6). Otherwise, the system design agent can treat the question as unanswered.

In some examples, the system design agent can send a summary of the inferred answers to the client, prompting the client to override any of the answers. The system design agent can send any response from the client along with the summary of the inferred answers to the LLM, prompting the LLM to update the summary based on the client response.

With answers to the set of questions obtained at operations 1006, 1012 whether based on inferences from obtained data about software systems or by prompting the client—the system design agent can proceed with providing a response to the prompt received at operation 1002.

At operation 1030, the system design agent can perform a reset operation to clear any context, state, or session data from the previous interactions between the SDS 110 and the LLM 1099 (e.g., to clear any memory maintained by the prompt and response engineering system 113, to reset a session with the LLM 199). Such a reset operation can be used to refocus the session (e.g., to avoid circumstances where the LLM has been prompted with an indication of available data sources that are not included in the summary, to avoid the LLM revisiting tangents, etc.).

At operation 1032, the system design agent sends a prompt including the task prompt (from operation 1002) and the stored questions and answers (whether inferred obtained data about software systems or solicited from the client) the prompt requesting the LLM to generate a proposed solution (or multiple proposed solutions). At operation 1034, the system design agent receives the response. At operation 1036, the system design agent sends the proposed solution (s) to the client 1001, which can be part of a prompt that includes a solicitation of additional questions about the proposed solution(s).

In some examples, the system design agent can store the questions and responses as preferences in user preferences 218. When user preferences are stored, the system design agent can first use an LLM to evaluate whether any of the questions received from the LLM are already answered in the stored preferences (e.g., prior to operation 1018). If any questions are stored as preferences, the system design agent can omit those questions from subsequent operations and include them in the prompt at operation 1032.

Prompts sent at operations 1004, 1010, 1018, 1022, and/or 1032, can be based on prompt templates in templates 212. Responses sent at operations 1026 and/or 1036 can be based on response templates in templates 212.

Validation agent operations can be performed on responses 1006, 1012, 1020, 1024, and/or 1034 (note that the response definitions in the preceding prompts are not always expressly identified in the figures). Sanitization agent operations can be performed on inputs 1002, 1006, 1012, 1020, 1024, 1028, and/or 1034.

Figure 12:
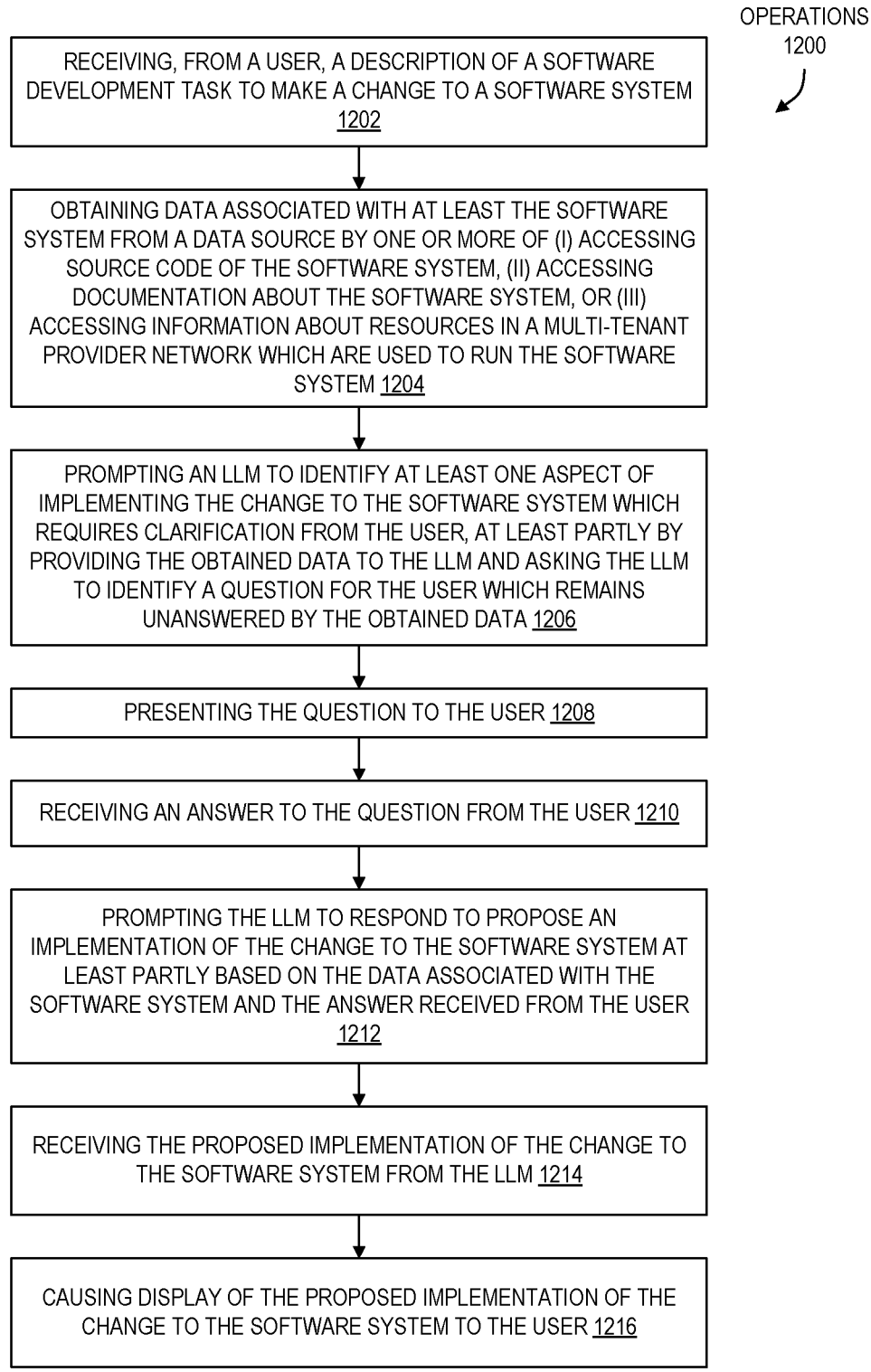
FIG. 12 is a flow diagram illustrating operations of a method for generating solutions to a software development task according to some examples.

FIG. 12 is a flow diagram illustrating operations of a method for generating solutions to a software development task according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by the SDS 110 of the other figures.

The operations 1200 include, at block 1202, receiving, from a user, a description of a software development task to make a change to a software system. The operations 1200 further include, at block 1204, obtaining data associated with the software system from a data source by one or more of (i) accessing source code of the software system, (ii) accessing documentation about the software system, or (iii) accessing information about resources in a multi-tenant provider network which are used to run the software system.

As described above, the SDS can obtain the application source code, for example because the user has indicated where its source repository is and provides access to the SDS, and also access documentation about the application and/or the cloud provider resources it runs on (ex: compute instances, block storage, databases, etc). For example, a user can assign an identity and access management role to the SDS in their account, so that the SDS can use the permission scope of the user to access such data associated with their software system. As another example of data associated with a software system, as described herein the SDS can query describe APIs of other cloud services on which the application runs to obtain information about the number, state, and configuration of the application resources, for example, using the role assigned to it in the user's account. A user can also provide a dictionary of their technical and business terms to the SDS as well as acronyms with definitions (referred to herein as a "business jargon dictionary"). With such information loaded, the SDS can use a combination of static analysis and artificial intelligence to understand a codebase and the relationships between components, as well as the relationships between network-connected services on which the application runs. For example, the SDS can extract the purpose or intent of an application from source code comments and documentation, and then present its understanding in natural language to the developer (who may of course edit the description to more closely match the application's intent). The intent is used as context in augmented prompts along with the architecture description.

The operations 1200 further include, at block 1206, prompting an LLM to identify at least one aspect of implementing the change to the software system which requires clarification from the user, at least partly by providing the obtained data to the LLM and asking the LLM to identify a question for the user which remains unanswered by the obtained data. The operations 1200 further include, at block 1208, presenting the question to the user. The operations 1200 further include, at block 1210, receiving an answer to the question from the user. The operations 1200 further include, at block 1212, prompting the LLM to respond to propose an implementation of the change to the software system at least partly based on the data associated with the software system and the answer received from the user. The operations 1200 further include, at block 1214, receiving the proposed implementation of the change to the software system from the LLM. The operations 1200 further include, at block 1216, causing display of the proposed implementation of the change to the software system to the user.

Figure 13:
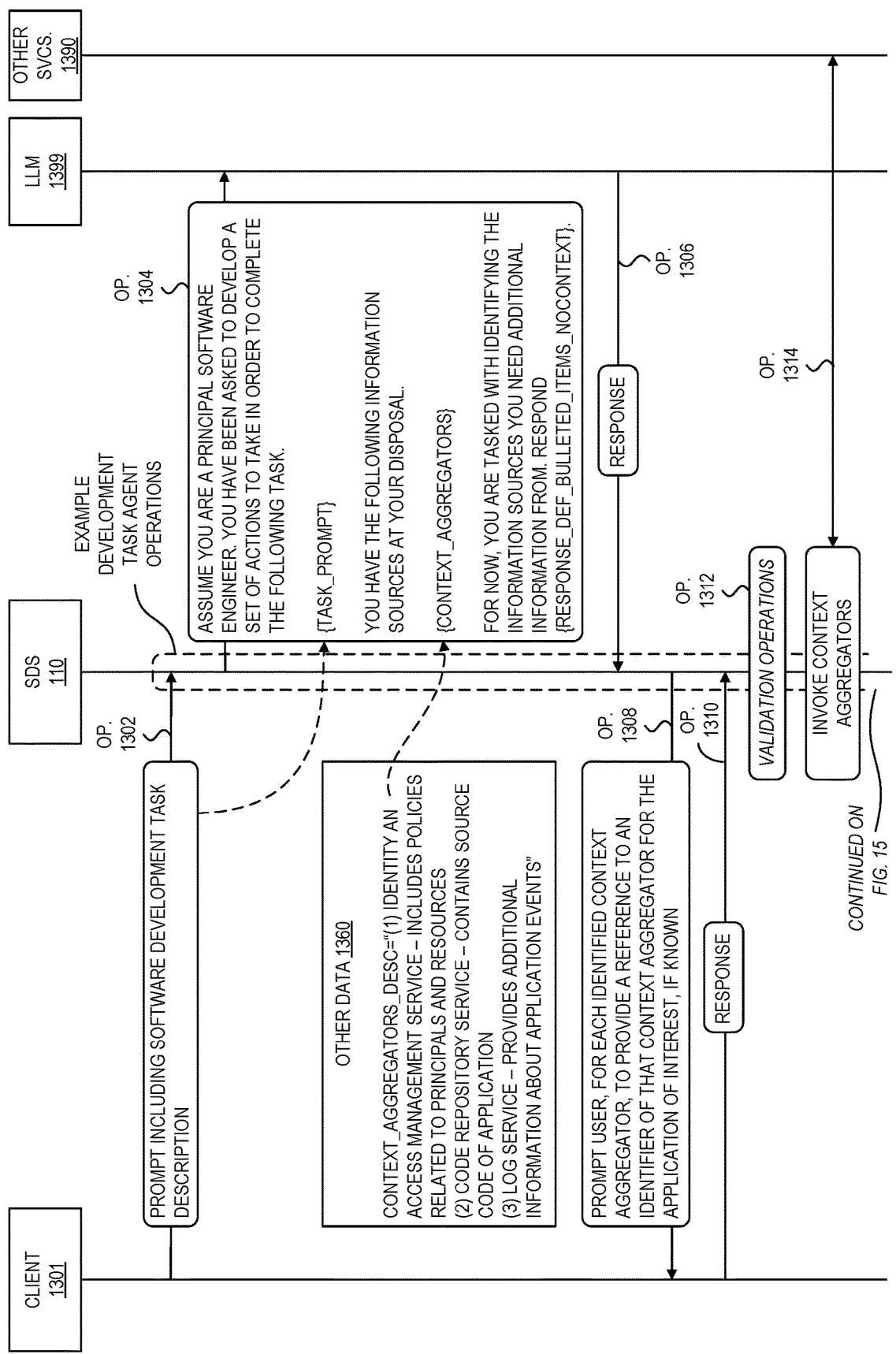
FIGS. 13 through 15 depict example operations of a development task agent according to some examples.
Figure 14:
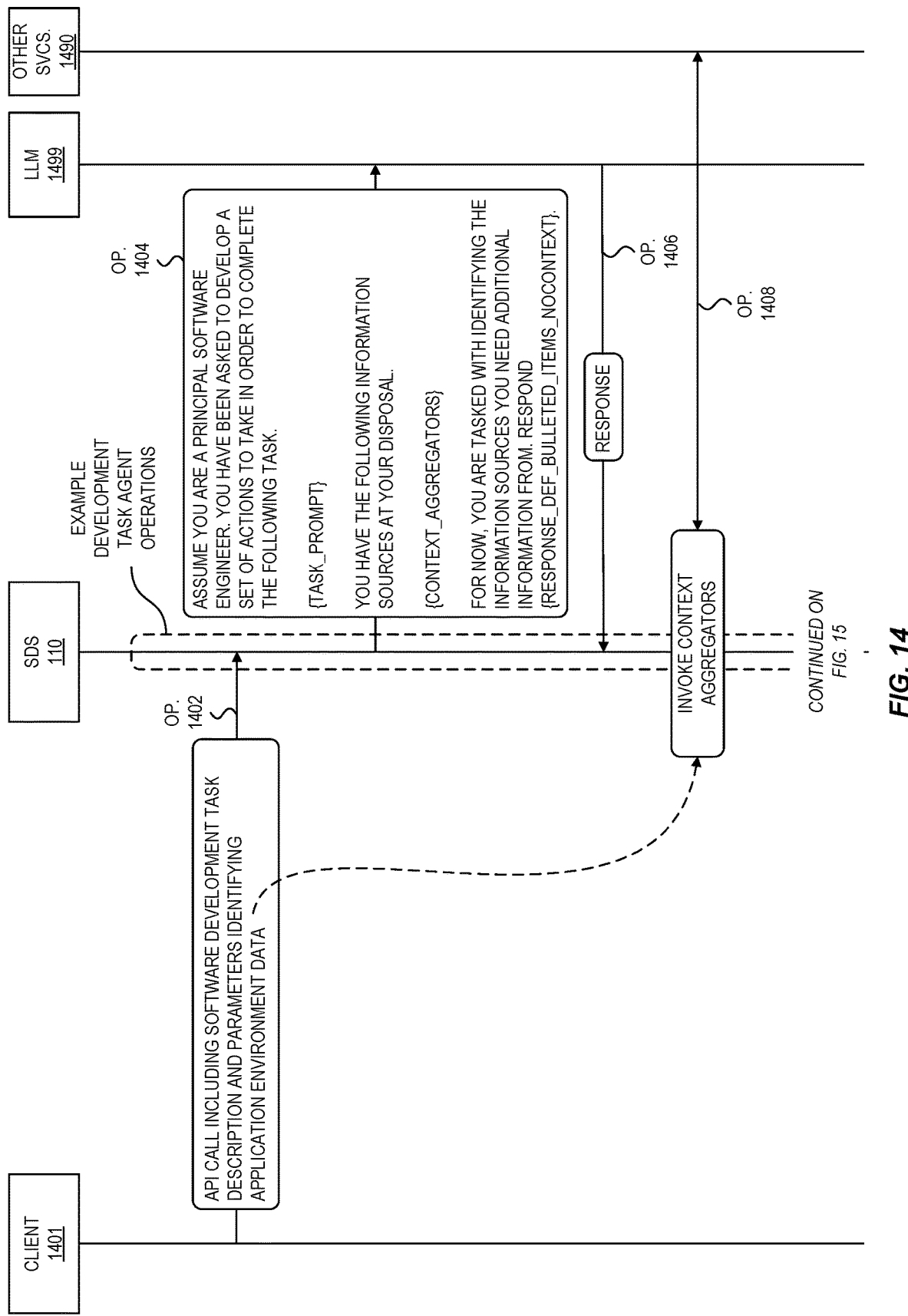
Figure 15:
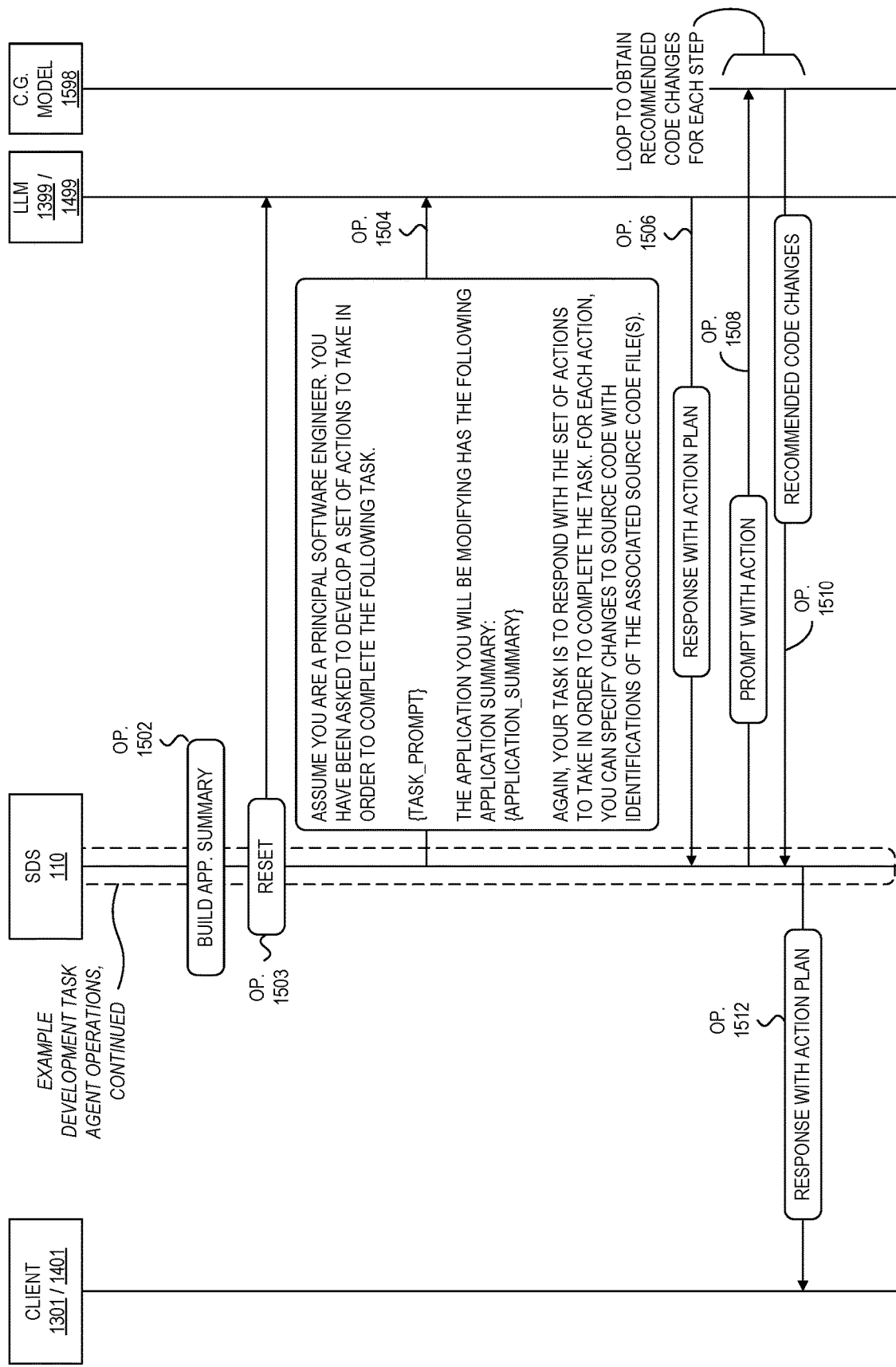

FIGS. 13 through 15 depict example operations of a development task agent according to some examples. A development task agent can break down a task prompt into a series of steps. Exemplary task prompts include change requests describing a feature addition, removal, bug fix, etc. The development task agent forms prompts that provide context regarding the task to the LLM. In some cases, that prompt may include information identified as useful or desirable by the LLM itself.

FIG. 13 depicts example operations when the development task agent is invoked without additional application context (e.g., without an identification of a particular software system to be modified). Such may be the case when a task prompt is provided via an API of a chat-based interface 106. At operation 1302, the development task agent receives a prompt from the client 1301 (by way of the orchestrator agent, for example), the prompt including a task prompt (typically in the form of a description or other indication of a desired change to a software program or system).

At operation 1304, the development task agent sends a prompt including the task prompt and available data sources to the LLM 1399, the prompt inquiring which if any additional context would aid the LLM in subdividing the task into a set of actions (also referred to as "an action plan"). In some examples, the context may be provided as a set of available data sources or context aggregators defined in other service data 1360 (e.g., as part of service data 115). At operation 1306, the development task agent receives a response from the LLM 1399, the response including an identification of the various additional information sources or context aggregators.

At operation 1308, the development task agent relays the contents of the response from the LLM 1399 to the client 1301, prompting the client to provide references to the identified sources, if known. At operation 1310, the development task agent receives a response from the client 1301. The response can include an identification of resources with various data sources, such as identifiers associated with a code repository, application environment, logs, etc. that can be used to obtain application specific context from other services 1390 (e.g., services 190, 192, 194 of FIG. 1).

At operation 1312, the development task agent performs various validation operations based on the response received at operation 1310. Given the freeform nature of the response, such operations may be tailored beyond what was described above with reference to the validation agent. For example, certain information in the received response may include self-identifying information or be of a format matching the parameters of an API for a given context aggregator. For example, a link to a code repository having a format identifying the code repository (e.g., github.com/project-name), which correlates with the code repository context aggregator. As another example, a provided reference may be of a certain file or resource type uniquely associated with a particular context aggregator. The development task agent can send a prompt to an LLM requesting that the responses be matched to the API(s) of the context aggregators in the form of API calls. The development task agent can try to invoke context aggregators with those LLM-provided calls, iteratively prompting the LLM to refine a call if the call failed.

At operation 1314, the development task agent invokes the context aggregators to gather data associated with the software system. Context aggregators gather information from data sources such as from other services 1390 (e.g., services 190, 192, 194 of FIG. 1).

FIG. 14 depicts example operations when the development task agent is invoked with an identification of application context (e.g., with an identification of a particular software system to be modified). Such may be the case when a task prompt is provided via an API call from a software application that includes various contextual identifications with the call. At operation 1402, the development task agent receives a request from the client 1401, the request including a task prompt (typically in the form of a description or other indication of a desired change to a software program or system). Accompanying the request may be one or more parameters identifying data sources (e.g., code repositories and the like).

At operation 1404, the development task agent sends a prompt including the task prompt and available data sources to the LLM 1499, the prompt inquiring which if any additional context would aid the LLM in subdividing the task into a set of actions (also referred to as "an action plan"). In some examples, the development task agent may modify the available data sources from a full set (e.g., as defined in other data 1360, not shown) to only those that were identified in the request received at operation 1402.

At operation 1406, the development task agent receives a response from the LLM 1499, the response including an identification of the various additional information sources or context aggregators. At operation 1408, the development task agent invokes the context aggregators to gather data associated with the software system. Again, context aggregators gather information from data sources such as from other services 1490 (e.g., services 190, 192, 194 of FIG. 1).

FIG. 15 depicts example operations once additional application context has been gathered. Continuing the example operations from either FIG. 13 or FIG. 14, at operation 1502, the development task agent generates an application summary. In some examples, a context aggregator invoked by the development task agent generates the application summary, the summary including an annotation or other description of the various context that has been gathered along with the context itself. An exemplary application summary can include source code files, API descriptions of public APIs, operating environment variables, other documentation excerpts scraped from source code comments, etc. Another exemplary application summary can be the application architecture map such as described above.

At operation 1503, the development task agent can perform a reset operation to clear any context, state, or session data from the previous interactions between the SDS 110 and the LLM 1399/1499, such as described elsewhere herein.

At operation 1504, the development task agent sends a prompt including the task prompt and the application summary to the LLM (be it the LLM 1399 or 1499), the prompt requesting that the LLM subdivide the task into a set of actions (also referred to as "an action plan"). At operation 1506, the development task agent receives a response from the LLM, the response including an action plan.

At operation 1508, the development agent can send a prompt including an action or step from the action plan to a code generation model 1598 (e.g., another generative AI model 197), the prompt including a request to generate code for the indication action or step and, optionally, context for the application (e.g., the application summary). At operation 1510, the development agent can receive the recommended code change(s). As indicated, the development agent can prompt the code generation model 1598 for recommended code changes for each action in the action plan. The development agent can store the recommended code change(s) associated with each action in the action plan.

In some examples, the development agent can obtain code diffs from another service of the provider network, providing the original source code and the recommended code change(s).

At operation 1512, the development task agent sends the action plan to the client (be it the client 1301 or 1401). The development agent can include within the action plan, for each action, the recommended code change(s), if any, obtained from the code generation model 1598.

Prompts sent at operations 1304, 1404, 1504, and/or 1508 can be based on prompt templates in templates 212. Responses sent at operations 1308 and/or 1512 can be based on response templates in templates 212.

Validation agent operations can be performed on responses 1306, 1406, and/or 1506 (note that the response definitions in the preceding prompts are not always expressly identified in the figures). Sanitization agent operations can be performed on inputs 1302, 1306, 1310, 1402, 1406, and/or 1506.

Figure 16:
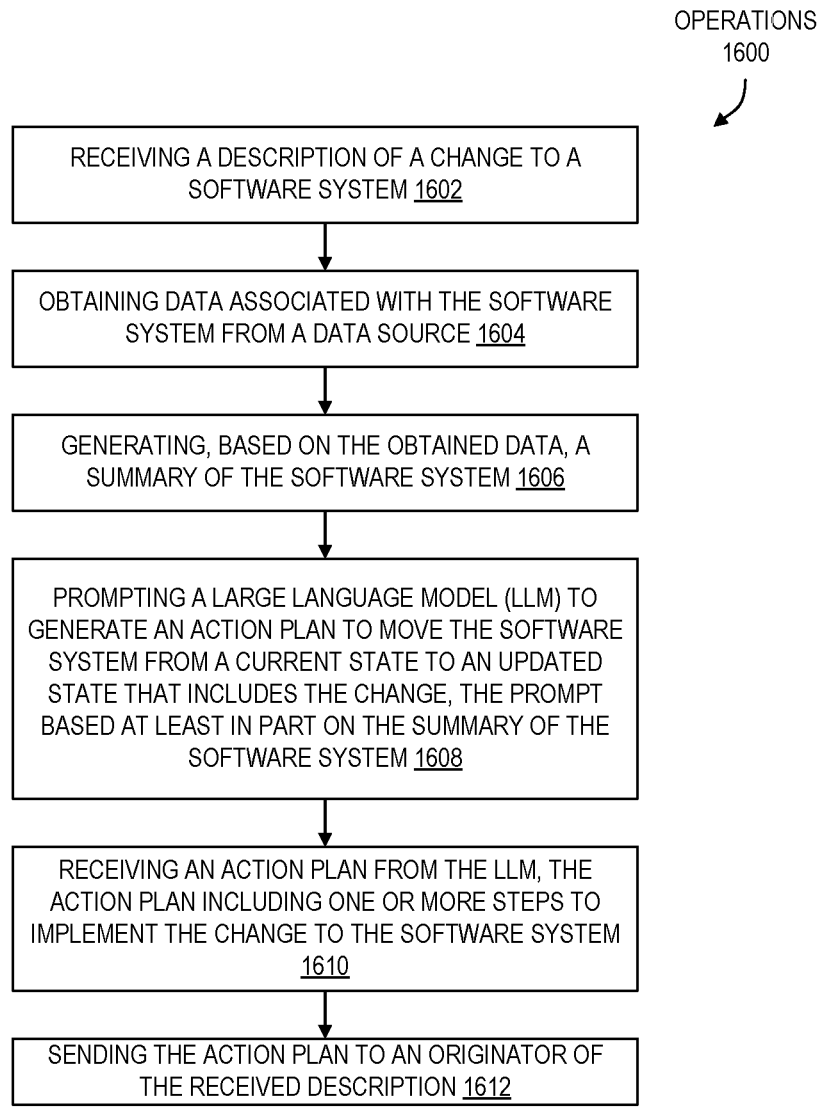
FIG. 16 is a flow diagram illustrating operations of a method for dividing a software development task into an action set according to some examples.

FIG. 16 is a flow diagram illustrating operations of a method 1600 for dividing a software development task into an action set according to some examples. Some or all of the operations 1600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1600 are performed by the SDS 110 of the other figures.

The operations 1600 include, at block 1602, receiving a description of a change to a software system. The operations 1600 further include, at block 1604, obtaining data associated with the software system from a data source (see for example the description of block 1208 for further details). The operations 1600 further include, at block 1606, generating, based on the obtained data, a summary of the software system. The operations 1600 further include, at block 1608, prompting a large language model (LLM) to generate an action plan to move the software system from a current state to an updated state that includes the change, the prompt based at least in part on the summary of the software system. The operations 1600 further include, at block 1610, receiving an action plan from the LLM, the action plan including one or more steps to implement the change to the software system.

The operations 1600 further include, at block 1612, sending the action plan to an originator of the received description. This step may further involve filtering or otherwise modifying the LLM output to be more suitable for presentation to the user. For example, the SDS can apply automated reasoning to prove its recommended changes meet the developer's intent, mathematically validating unambiguous actions such as identity and access management policy changes and smaller code changes before presenting them to the user. The action plan can include a step by step guide to accomplishing the developer's task, as well as any code and architectural changes that are needed for each step. Recommended actions that are provably correct can be identified as such in the source commit comments. These architectural changes can be visualized in a dynamic, interactive canvas as described herein. The developer can review the proposal and revise any provided code, as well as refine their requirements to loop back through steps 1608-1612. Such revisions and refinements can be used in reinforcement learning to improve the LLM's accuracy. For example, a developer could review the action plan and proposed changes and realize that they also require device authentication, and instruct the SDS to regenerate the action plan to include this. The SDS can be aware from its ingestion of cloud service information that a specific service supports mutual TLS authentication and would suggest enabling the feature and adding a certificate manager to the architecture. The SDS can also generate integration and end-to-end tests such as unit tests to verify the proposed changes.

Figure 17:
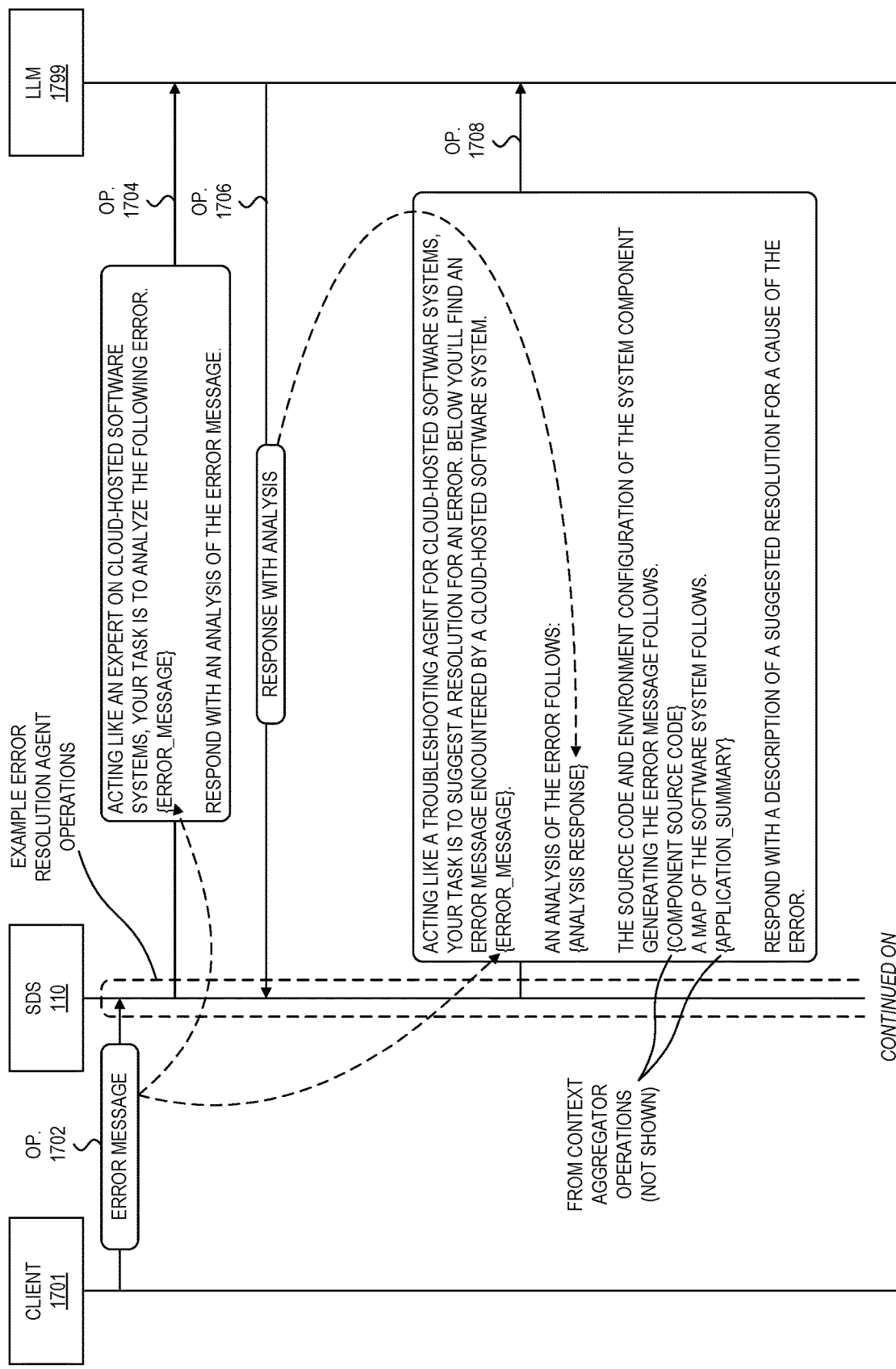
FIGS. 17 and 18 depict example operations of an error resolution agent according to some examples.
Figure 18:
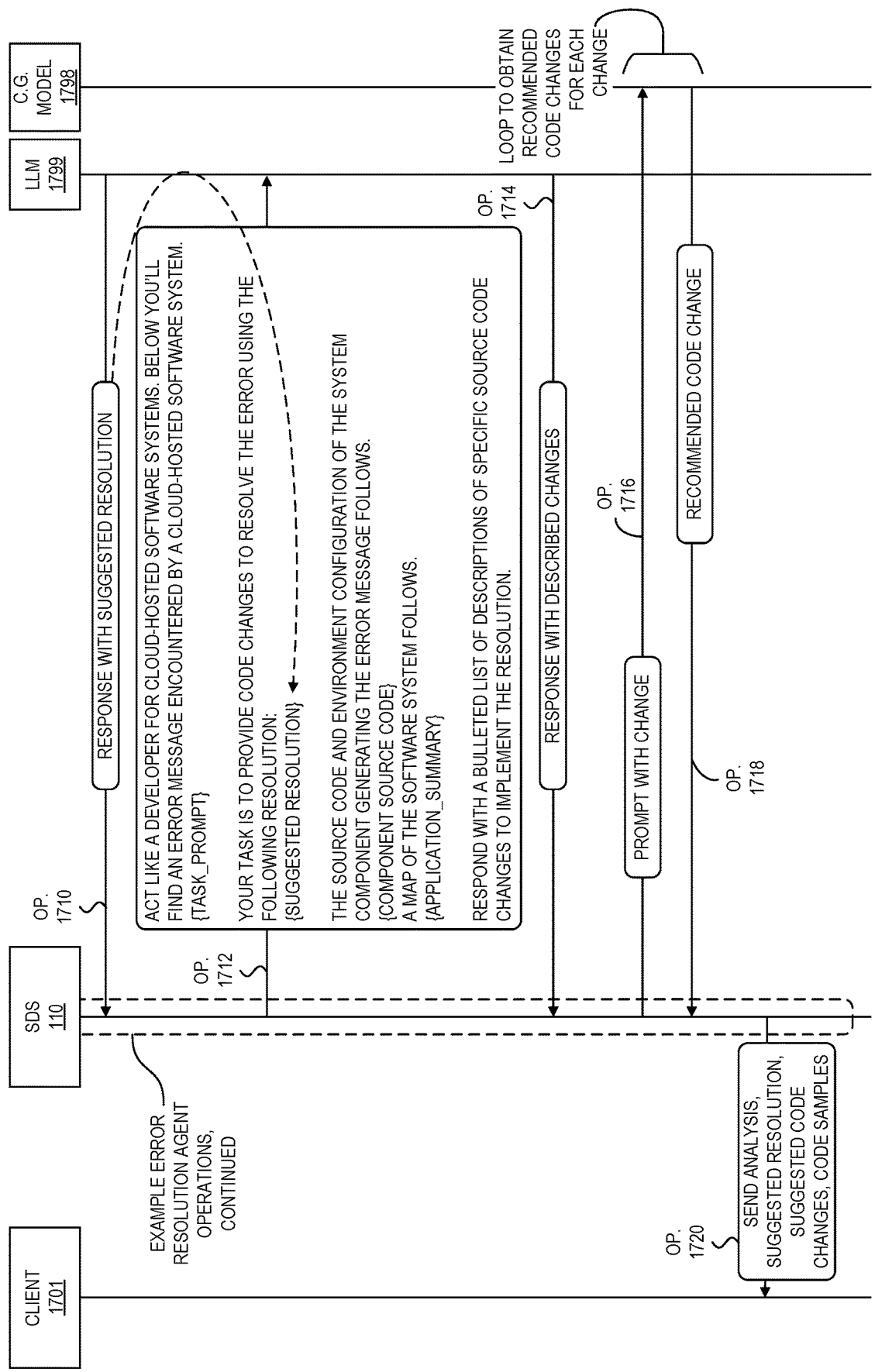

FIGS. 17 and 18 depict example operations of an error resolution agent according to some examples. An error resolution agent can leverage an LLM to analyze and suggest resolutions to errors generated by a software system.

At operation 1702, an error resolution agent receives a message including a description of an error message that can include the actual error generated by a software system. Although not illustrated, the message may be transmitted as a prompt or API call, similar to the task description received at operations 1302, 1402. The error resolution agent can also leverage context aggregators to gather data about the software system generating the error. For example, the error resolution agent can perform operations similar to those described above for the task development agent (e.g., operations 1304 through 1314 and operation 1502 or operations 1404 through 1408 and operation 1502; note the prompt templates can have adjusted language to indicate the task is error troubleshooting).

At operation 1704, the error resolution agent sends a prompt including the error message to the LLM 1799, the prompt requesting that the LLM generate an analysis of the error. At operation 1706, the error resolution agent receives a response from the LLM, the response including an error analysis.

At operation 1708, the error resolution agent sends a prompt including the error message and the analysis received at operation 1706 to the LLM 1799, the prompt requesting a suggested resolution to the error. The prompt can further include various software system data such as a system map and source code of the software system as generated or obtained by context agents.

Continuing to FIG. 18, at operation 1710, the error resolution agent receives a response from the LLM, the response including a description of a suggested resolution.

At operation 1712, the error resolution agent sends a prompt including the error message, the analysis received at operation 1706, and the suggested resolution received at operation 1710 to the LLM 1799, the prompt requesting descriptions of one or more source code changes to resolve the error. This prompt can be considered an "implementation" prompt to implement a change to correct a cause of the error message. Again, the prompt can further include various software system data such as a system map and source code of the software system as generated or obtained by context agents.

At operation 1714, the error resolution agent receives a response including the descriptions of source code changes.

At operation 1716, the error resolution agent can send a prompt including a change to a code generation model 1798 (e.g., another generative AI model 197), the prompt including a request to generate code for the indication action or step and, optionally, context for the application (e.g., the application summary). At operation 1718, the development agent can receive the recommended code change(s). As indicated, the development agent can prompt the code generation model 1798 for a recommended code change for each suggested change. The error resolution agent can store the recommended code change(s).

In some examples, the error resolution agent can leverage the LLM 1799 to generate the source code changes. In some examples, the error resolution agent can phrase the implementation prompt to provide the source code changes in addition to or instead of the descriptions of the changes.

At operation 1720, the error resolution agent sends a response to the client 1701. The response can include a summary of the error, the error analysis from operation 1706, the suggested resolution from operation 1710, and descriptions of each change and associated code changes (from operations 1714, 1718).

In some examples, upon receiving the response from the LLM at operation 1710, the error resolution agent can invoke a development task agent, leveraging the analysis and suggested resolution as a task prompt.

Prompts sent at operations 1704, 1708, 1712, and/or 1716 can be based on prompt templates in templates 212. The response sent at operation 1720 can be based on a response template in templates 212.

Validation agent operations can be performed on responses 1706, 1710, and/or 1714 (note that the response definitions in the preceding prompts are not always expressly identified in the figures). Sanitization agent operations can be performed on inputs 1702, 1706, 1710, and/or 1714.

Figure 19:
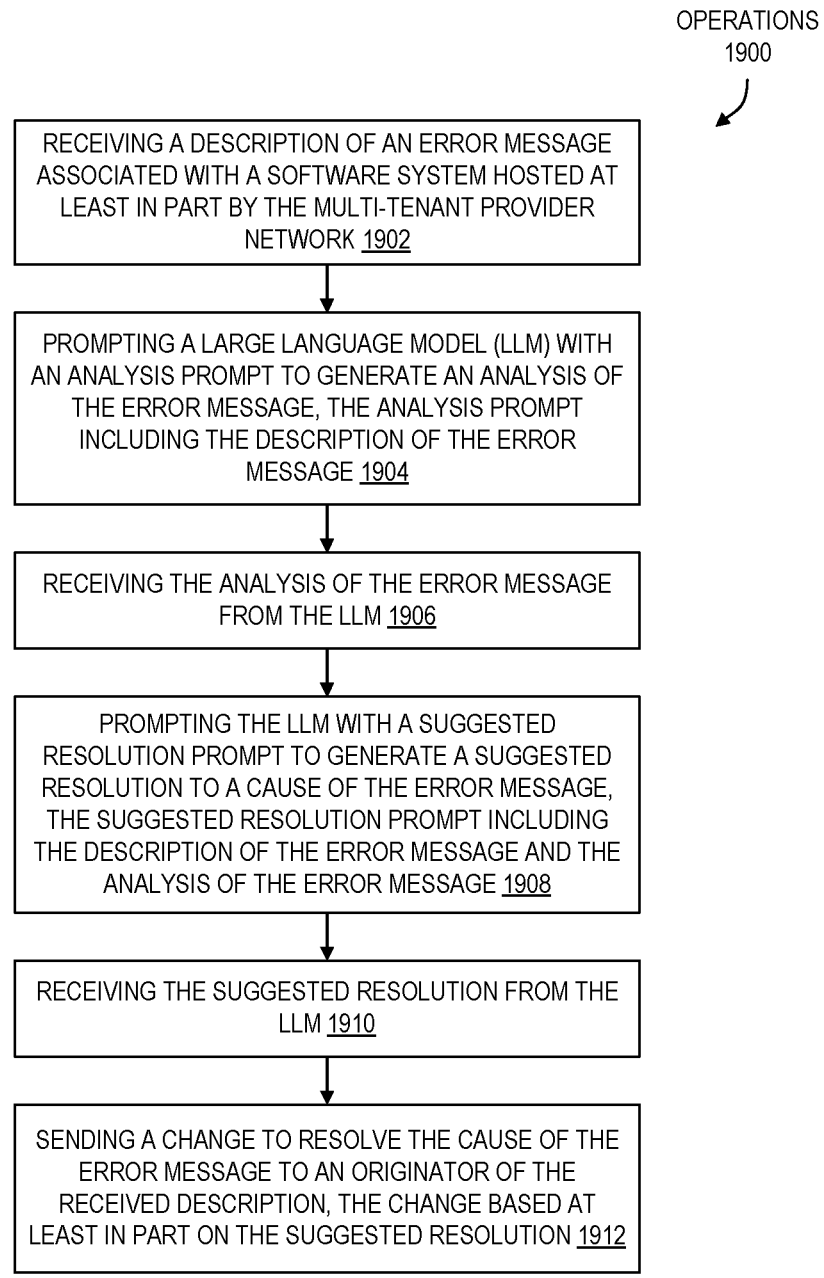
FIG. 19 is a flow diagram illustrating operations of a method for generating suggested resolutions to an error according to some examples.

FIG. 19 is a flow diagram illustrating operations of a method 1900 for generating suggested resolutions to an error according to some examples. Some or all of the operations 1900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1900 are performed by the SDS 110 of the other figures.

The operations 1900 include, at block 1902, receiving a description of an error message associated with a software system hosted at least in part by the multi-tenant provider network. In some scenarios this can be received from a user who has discovered the error and engages the SDS for resolution. For example, a developer may discover an error in their application metric logs. In some scenarios, the user may receive notification of the discovered error from another service or program, and can press a user interface button or otherwise select an option to resolve the error, which can trigger the SDS on the backend to generate the resolution on behalf of the user. Although not illustrated, in some scenarios a developer may first engage with the SDS with a request to generate a test that replicates the error. The SDS gathers the error information and the application context to generate a test that triggers the same bug or vulnerability. The code for the test can be sent as a pull request to the source management system, and the developer can collaborate with the SDS via code review comments in the pull request to refine the generated code. Once the pull request is merged, the developer can move over to an IDE to quickly execute the new test, then pick up the conversation with the SDE in the IDE to generate the code required to resolve the bug.

It will be appreciated that such conversations in a source management system/IDE and other feedback on generated content described herein can be used via reinforcement learning to improve the SDS's accuracy. The SDS can look for "implied" acceptance or rejection from users, for example by mixing point-and-click visual interfaces in the SDS's answer, making it easier for users to take an action while unambiguously confirming the correct answers. For example, a user clicking the "apply" for one-click resolutions is a good indication that the SDS's proposed solution is correct.

The operations 1900 further include, at block 1904, prompting a large language model (LLM) with an analysis prompt to generate an analysis of the error message, the analysis prompt including the description of the error message. Block 1904 can also include augmenting the prompt to the LLM with context about the application and/or systems on which it runs, as described for example with respect to block 1208. The operations 1900 further include, at block 1906, receiving the analysis of the error message from the LLM. The operations 1900 further include, at block 1908, prompting the LLM with a suggested resolution prompt to generate a suggested resolution to a cause of the error message, the suggested resolution prompt including the description of the error message and the analysis of the error message. The operations 1900 further include, at block 1910, receiving the suggested resolution from the LLM. The operations 1900 further include, at block 1912, sending a change to resolve the cause of the error message to an originator of the received description, the change based at least in part on the suggested resolution.

Figure 20:
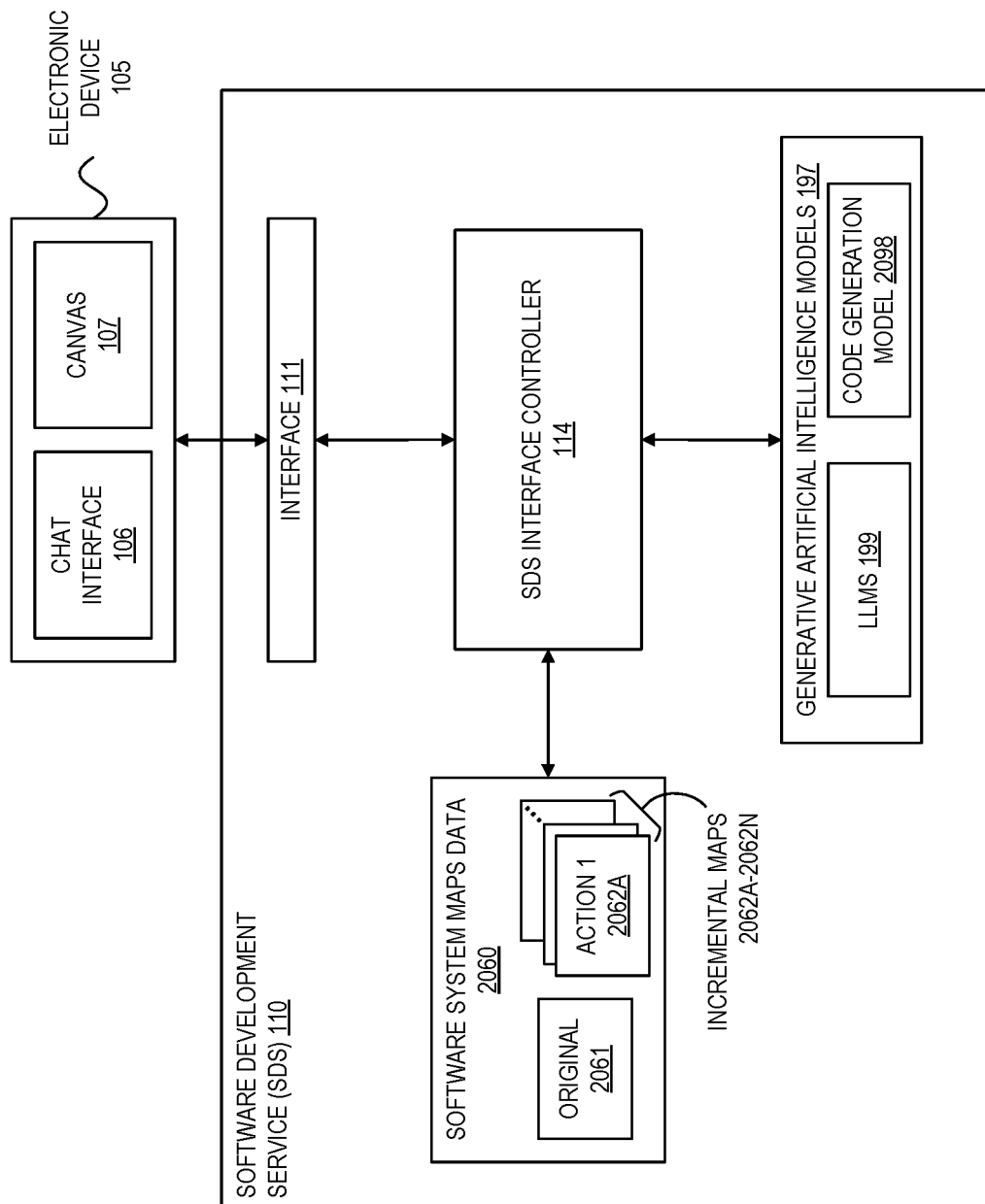
FIG. 20 depicts an interface controller of the software development service according to some examples.

FIG. 20 depicts an interface controller of the software development service according to some examples. In addition to providing the chat-based interface that can be evaluated by the various agents described herein, the SDS 110 can include an SDS interface controller 114 to manage user interactions via user interfaces such as the chat-based interface 106 and the canvas interface 107. The canvas 107 can provide a graphical view of a software system with various resources represented as nodes and connections or dependencies between those resources represented as edges or connections between the nodes. An exemplary canvas 107 can be provided as part of a web-based interface in which the SDS interface controller 114 generates the HTML, CSS, Javascript, etc. that can be rendered by a web browser or other application (e.g., a software development application) executing on the electronic device 105.

The canvas 107 can provide an interface through which users can edit their software systems graphically rather than in a code editor. Exemplary edits can include adding, removing, or changing cloud based resources used by the system, editing code of components, editing data flows between resources, etc. An example graphical interface is illustrated and described in FIG. 21.

A software system can be represented with a system map stored in a structured language. Software system maps data 2060 for a given software system can store various maps of the system given changes to the system as part of a development effort. The system maps data 2060 can be stored in a data store backed by storage infrastructure of the provider network (e.g., an object storage service, a database service, etc.). In some examples, users can make edits to an original system map 2061 via the interfaces 106, 107, the edits tracked in incremental maps 2062A-2062N. For example, if the user loads an original map 2061 and makes a change, that change can be stored in action 1 map 2062A. If the user makes another change, that change can be stored in action 2 map 2062B, and so on. The original system map 2061 may be user defined or generated by the context aggregator 429. Incremental maps may contain data in the form of changes from a prior map or a complete representation of the system in standalone form.

In some examples, the SDS interface controller 114 invokes an LLM 199 to generate new system maps (e.g., actions 2062) given a change. For example, the SDS interface controller 114 can receive a description of a change from the chat-based interface 106 or from the canvas interface 107 and prompt the LLM 199 to generate an updated system map given the previous system map (e.g., the original system map 2061) and the description of the change. In some examples, the SDS interface controller 114 can first validate a requested change. For example, the SDS interface controller 114 controller can submit a prompt including a system map before a change and a description of the change, requesting that the LLM 199 indicate whether the change is permitted (e.g., with a yes or no). Based on its learned knowledge of system architectures, APIs, etc., the LLM 199 can respond. If the response indicates the change is permitted, the SDS interface controller 114 can request the generation of an updated system map. If not, the SDS interface controller 114 can prompt the LLM 199 for an explanation, which can be provided to the user via the interface(s) 106, 107.

In some examples, the SDS interface controller 114 can allow a user to step through actions. For example, the original system map 2061 may be step 0, the action 1 system map 2062A may be step 1, the action 1 system map 2062A may be step 2, and so on. In displaying step 2, the SDS interface controller 114 can generate data to cause the canvas 107 to render graphical indications of the differences between step 1 and step 2.

In some examples, rather than tracking actions by the user as the user edits the system map via the interfaces 106, 107, the SDS interface controller 114 can load a software system and an action plan (e.g., generated by a development task agent), with the steps of the action plan corresponding to actions 2062A-2062N.

In some examples, the SDS interface controller 114 synchronizes the interfaces 106, 107. For example, if a user enters text into the chat-based interface 106 to modify a software system, the SDS interface controller 114 can provide the response to the text from the LLM and also update the display of the software system on the canvas 107. Likewise, if a user modifies a software system via inputs on the graphical view of a software system in the canvas 107, the modification can be formalized as a command reflected in the chat-based interface, and the result can be reflected both in a text-based response to the command and in an update to the graphical view of the software system displayed in the canvas 107. For example, a user may enter "add a load balancer in front of my web server" into a chat-based interface 106, which can then be reflected in the canvas 107 once the SDS 110 has generated a proposal for the change (e.g., via the development task agent operations described above).

Figure 21:
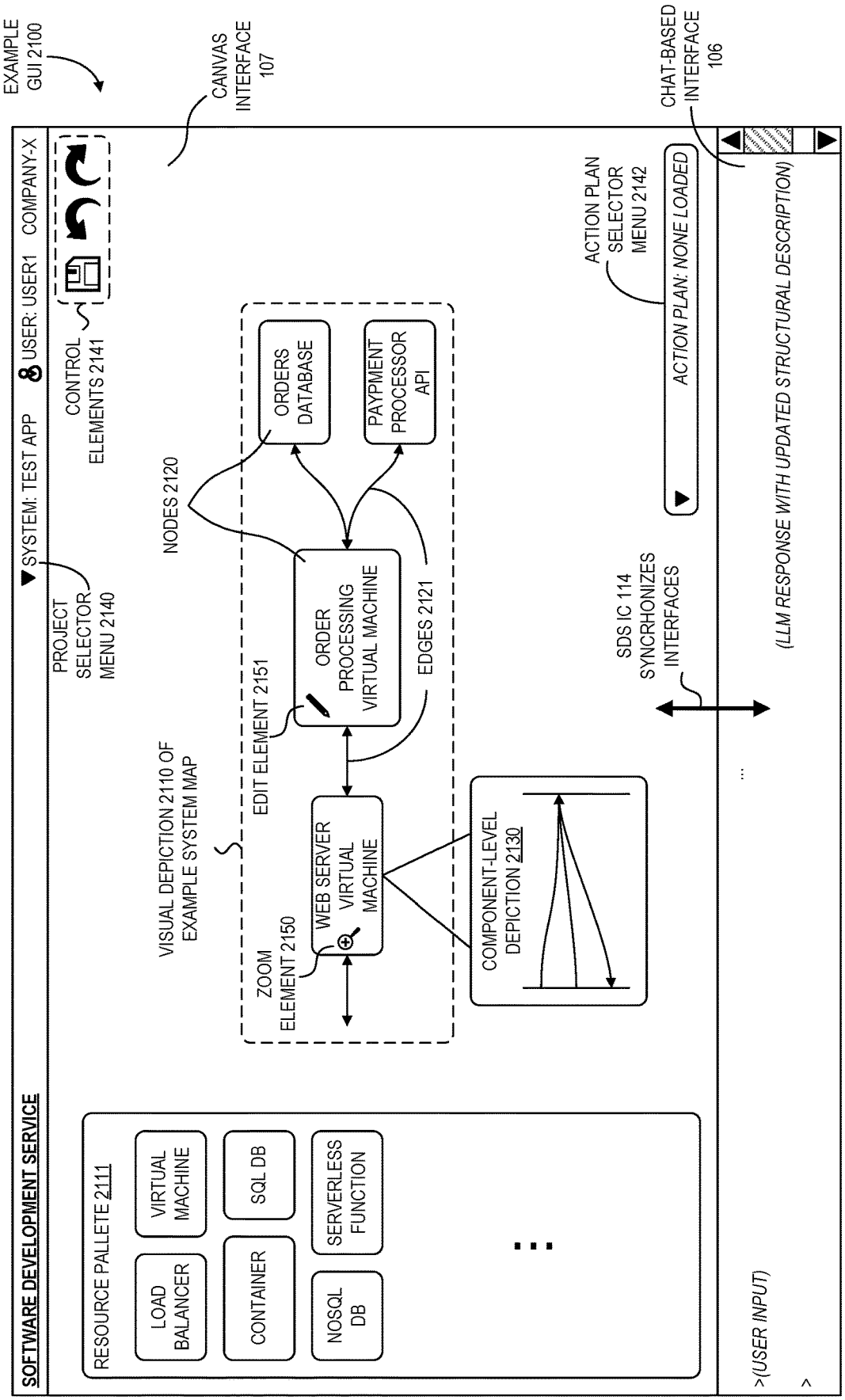
FIG. 21 illustrates a graphical user interface of the software development service according to some examples.

FIG. 21 illustrates a graphical user interface of the software development service according to some examples. The SDS interface controller 114 can generate the data to cause an electronic device to render the example GUI 2100 and various GUI elements described below. The example GUI 2100 displays a visual depiction 2110 of an example system map in a canvas interface 107 along with a chat-based interface 106. The visual depiction 2110 includes nodes 2110 representing resources of the system and edges 2121 representing connections or dependencies amongst resources. Users can interact with these map components, e.g., by dragging them with a mouse cursor, selecting them and deleting them with a context menu (e.g., displayed via a right click, not shown) or delete keypress on a keyboard, etc.

In some examples, the GUI 2100 includes a resource palette 2111 that includes various resources of a cloud provider network available to a user. The user can drag resources from the palette onto their system map as new nodes. The user can also create connections between nodes. For example, the nodes 2120 can include handles (not shown) that the user can select and drag to other nodes to create new edges 2121.

In some examples, the GUI 2100 can display an edit element 2151 on nodes and/or edges. The edit element 2151 can be displayed upon selection of the node or edge, for example. Selecting the edit element 2151 allows users to edit the properties of the associated node or edge, such as variable names, function calls, functions, etc.

In some examples, the GUI 2100 can display a zoom element 2150 on nodes and/or edges. The zoom element can allow a user to view in greater detail the underlying system component. For example, selecting the zoom element 2150 of the web server virtual machine can cause the display of a component-level depiction 2130 that shows the dataflows at the application level.

In some examples, some nodes and edges may be a collapsed view of multiple other nodes or edges. Selecting the zoom element 2150 allows users to explode the that collapsed view into its constituent components. For example, a cluster having a leader and workers may be displayed as a single node. Selecting a zoom element of that cluster can display the leader and workers. As another example, an edge might represent multiple API calls collapsed into a single edge. Selecting a zoom element of that edge can display each of the various calls along with their parameters.

In some examples, the GUI 2100 includes a project selector menu 2140 that allows a user to select a software system. In some examples, the GUI 2100 includes control elements 2141. Control elements can include a save, undo, and redo buttons to perform the associated operations. In some examples, the save button causes the SDS interface controller 114 to save the existing state of the software system as an action 2062. In some examples, the GUI 2100 includes an action plan selector menu 2142. The SDS 110 may store previously generated action plans, and the GUI 2100 allows a user to select one of those action plans for review in the GUI 2100.

In some examples, the SDS interface controller 114 can reflect inputs and outputs between interfaces 106, 107, as indicated by the bold arrow between the canvas interface 107 and the chat-based interface 106.

In some examples, the SDS interface controller 114 reflects changes to a software system with colors on system components (e.g., green for additions, red for deletions). In such cases, the SDS interface controller 114 can provide support for multiple color schemes to support colorblind users.

FIGS. 22 through 26 illustrate a progression of changes to a software system with the software development service according to some examples. The graphical user interface 2100 of FIG. 21 can be used to display visual differences between states (or versions) of a software system. To illustrate these visual differences, FIGS. 22 through 26 illustrate various visual differences associated with the incremental actions. Such actions may be created by the user or as part of an action plan, such as the one obtained from an LLM by a development task agent as described above.

Figure 22:
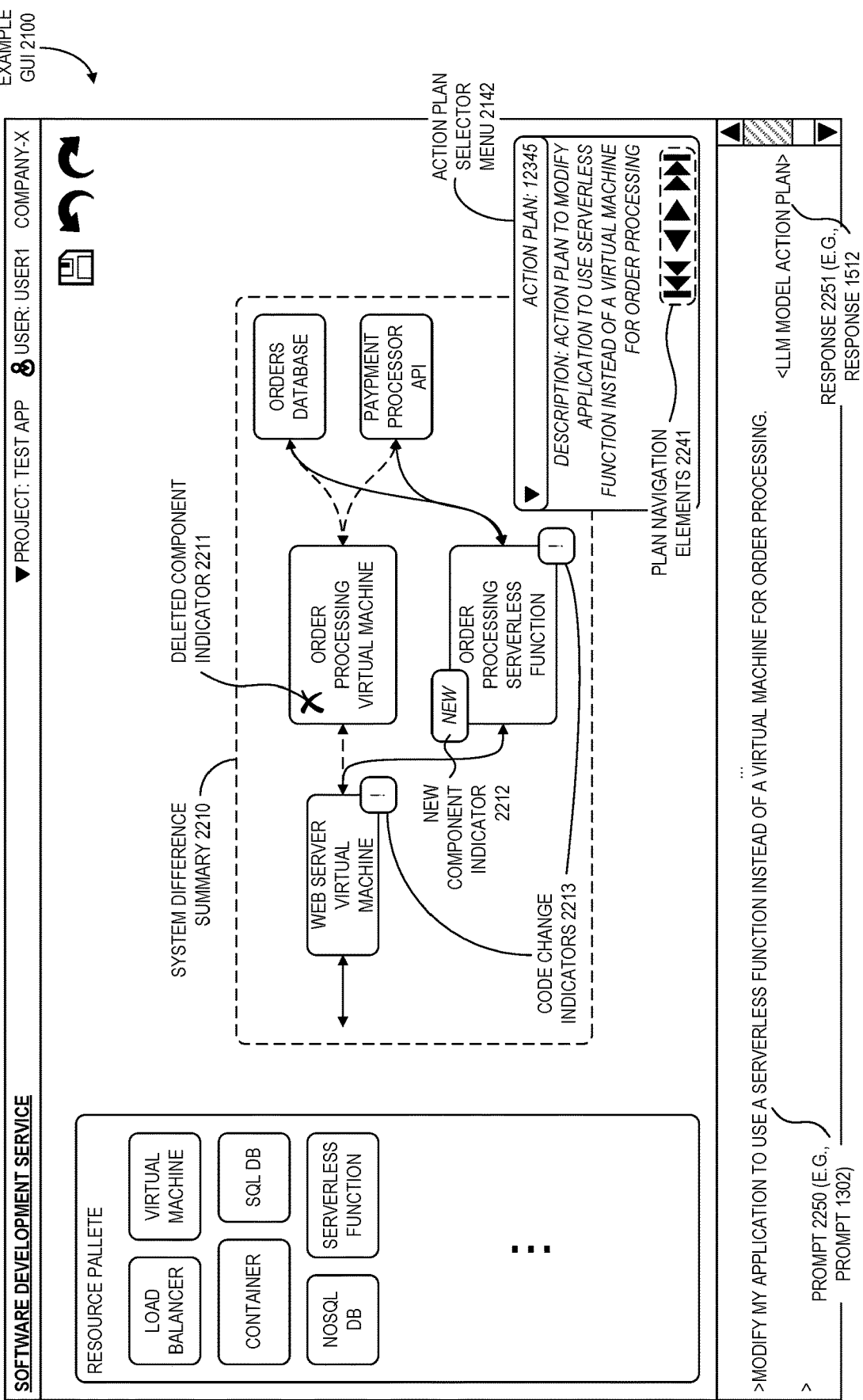
FIGS. 22 through 26 illustrate a progression of changes to a software system with the software development service according to some examples.

Beginning with FIG. 22, the GUI 2100 displays an overview of the action plan 12345. A user may have loaded the action plan the action plan selector menu 2142 or generated an action plan via the development task agent as indicated by the prompt 2250 and response 2251, causing the SDS interface controller 114 to send data to cause the updated GUI display. The canvas displays a system difference summary 2210 that shows differences that are part of the action plan (e.g., from the initial visual depiction 2110 through the final step of the action plan). A description of the action plan can also be displayed. The differences can be highlighted with various indicators, such as a deleted component indicator 2211 indicating that the "order processing virtual machine" is deleted, a new component indicator 2212 indicating that the "order processing serverless function" is added, and code change indicators 2213 indicating that the "web server virtual machine" and the "order processing serverless function" will have code changes. Indicators can take on a variety of forms, such as the icons (as shown), border line weights, border line types, colors, shading, etc.

Figure 23:
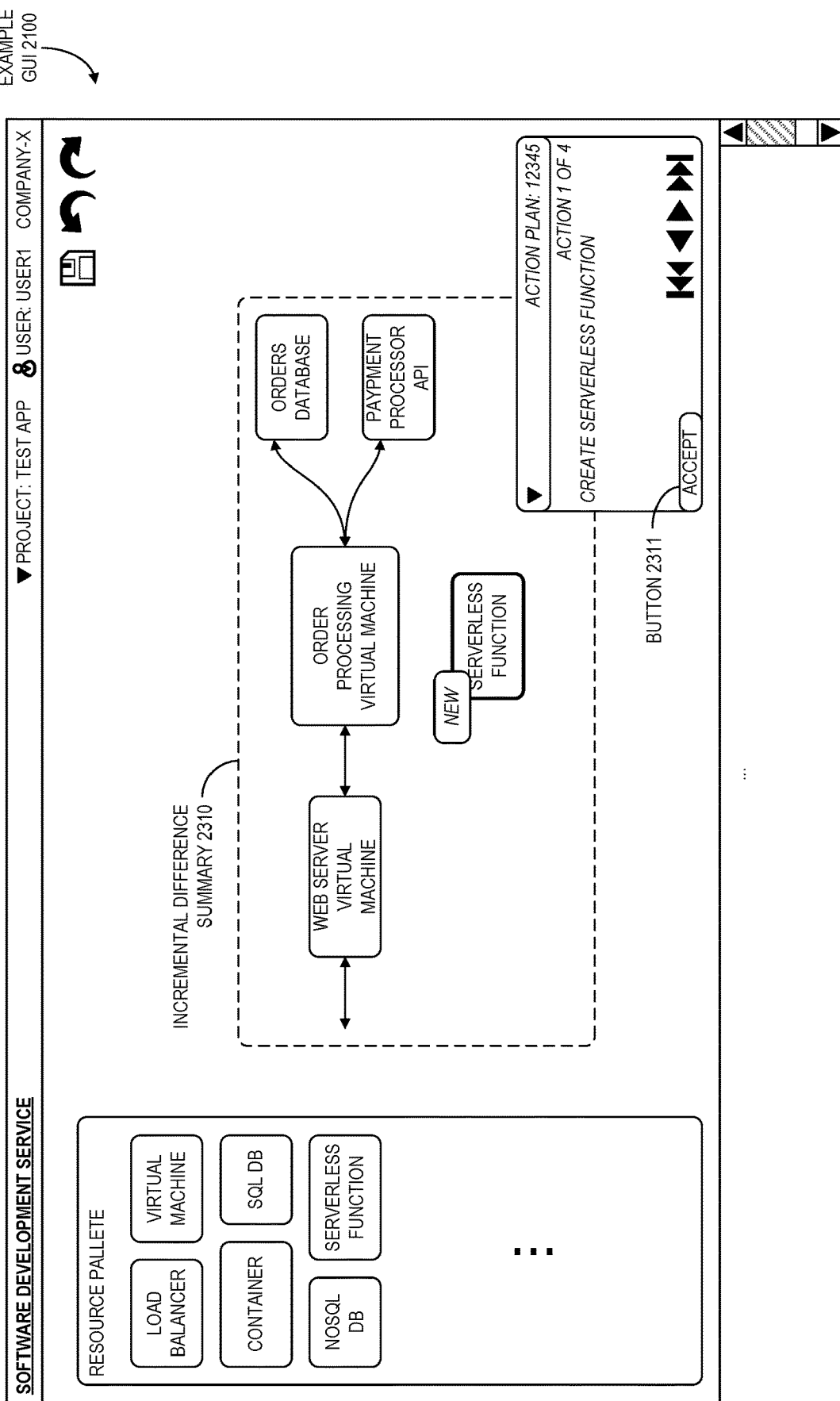

In some examples, the GUI 2100 includes plan navigation elements 2241 to step through the action plan. The user selecting a next action button causes the SDS interface controller 114 to display the next incremental difference, as shown in FIG. 23.

Figure 24:
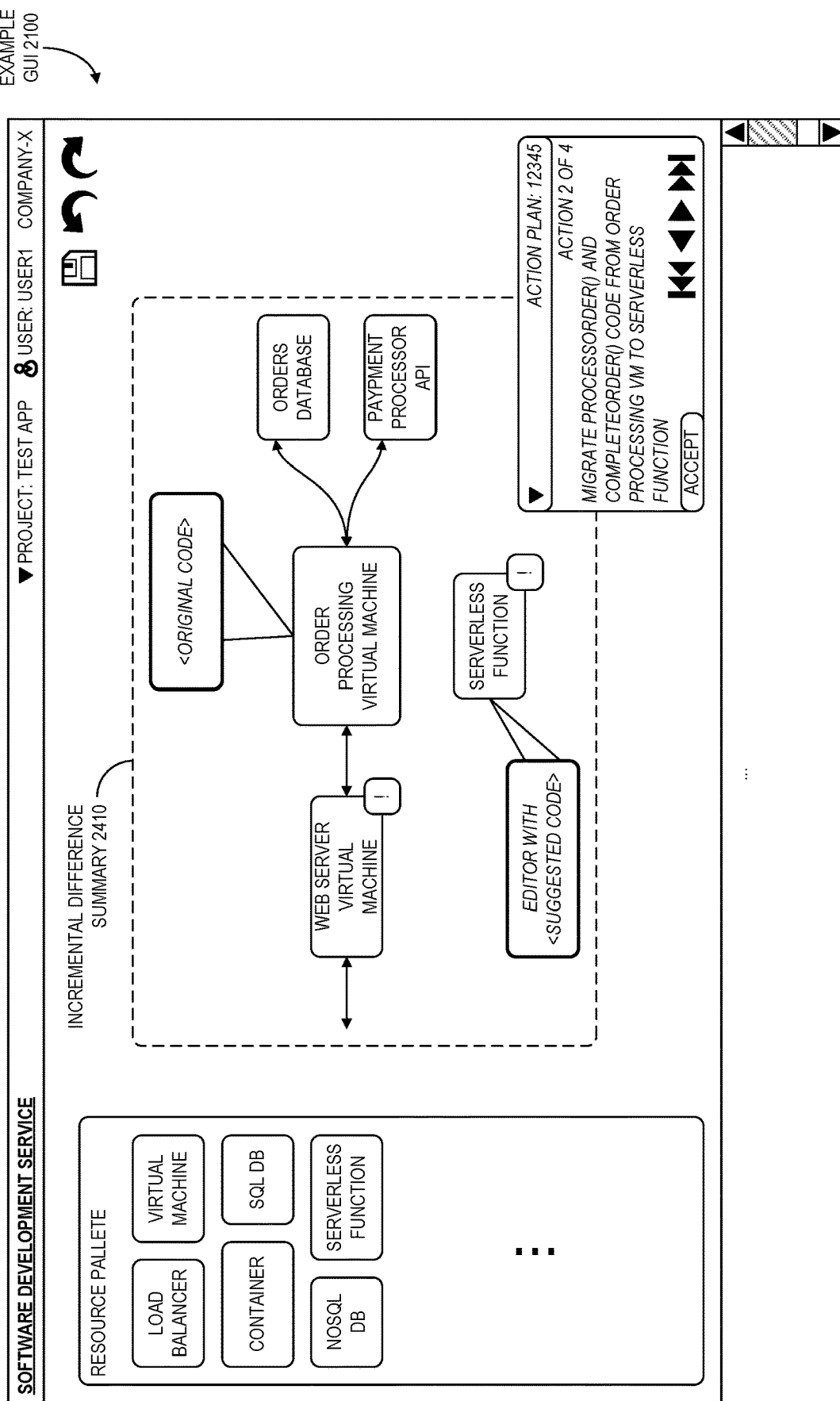

There, the SDS interface controller 114 causes the display an incremental difference summary 2310 associated with an action (in this case, action 1 of 4) based on a difference between the prior system map and the post-action system map (e.g., the original system map 2061 and the first action system map 2061A). The incremental difference summary 2310 includes the change associated with the step, here, adding a new serverless function. The GUI 2100 includes an accept button 2311 that the user can use to accept the change associated with the displayed step. The user selecting the next action button causes the SDS interface controller 114 to display the next incremental difference, as shown in FIG. 24.

Figure 25:
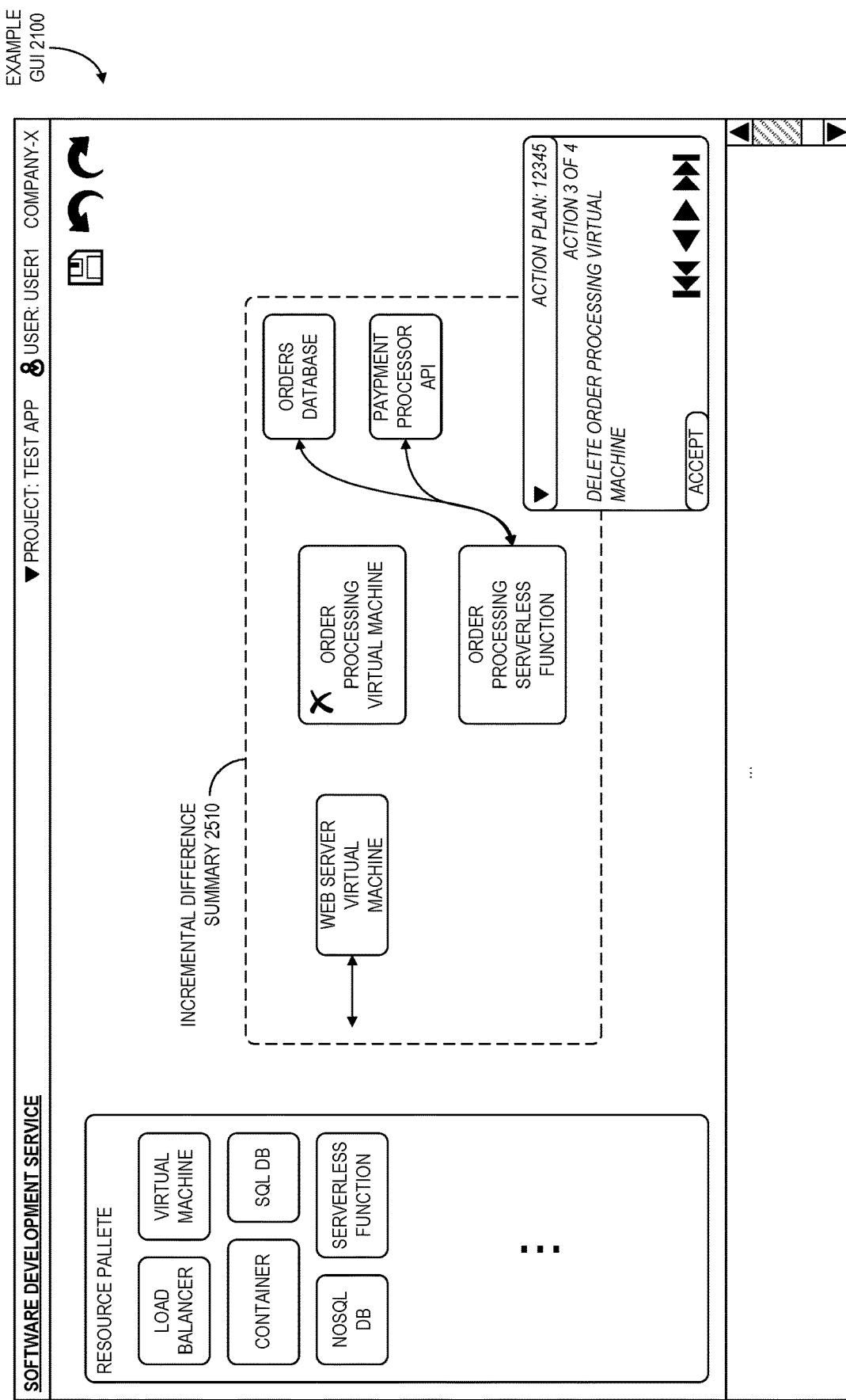

The SDS interface controller 114 causes the display an incremental difference summary 2410 associated with an action (in this case, action 2 of 4) based on a difference between the prior system map and the post-action system map. The incremental difference summary 2410 includes the change associated with the step, here, migrating code from the virtual machine to the serverless function. The GUI 2100 can include code editors displaying the code of the virtual machine and the code of the serverless function. The editor of the new serverless function can include sample code generated with the action plan (e.g., from a code generation model). The GUI 2100 includes an accept button that the user can use to accept the change associated with the displayed step. The user selecting the next action button causes the SDS interface controller 114 to display the next incremental difference, as shown in FIG. 25.

Figure 26:
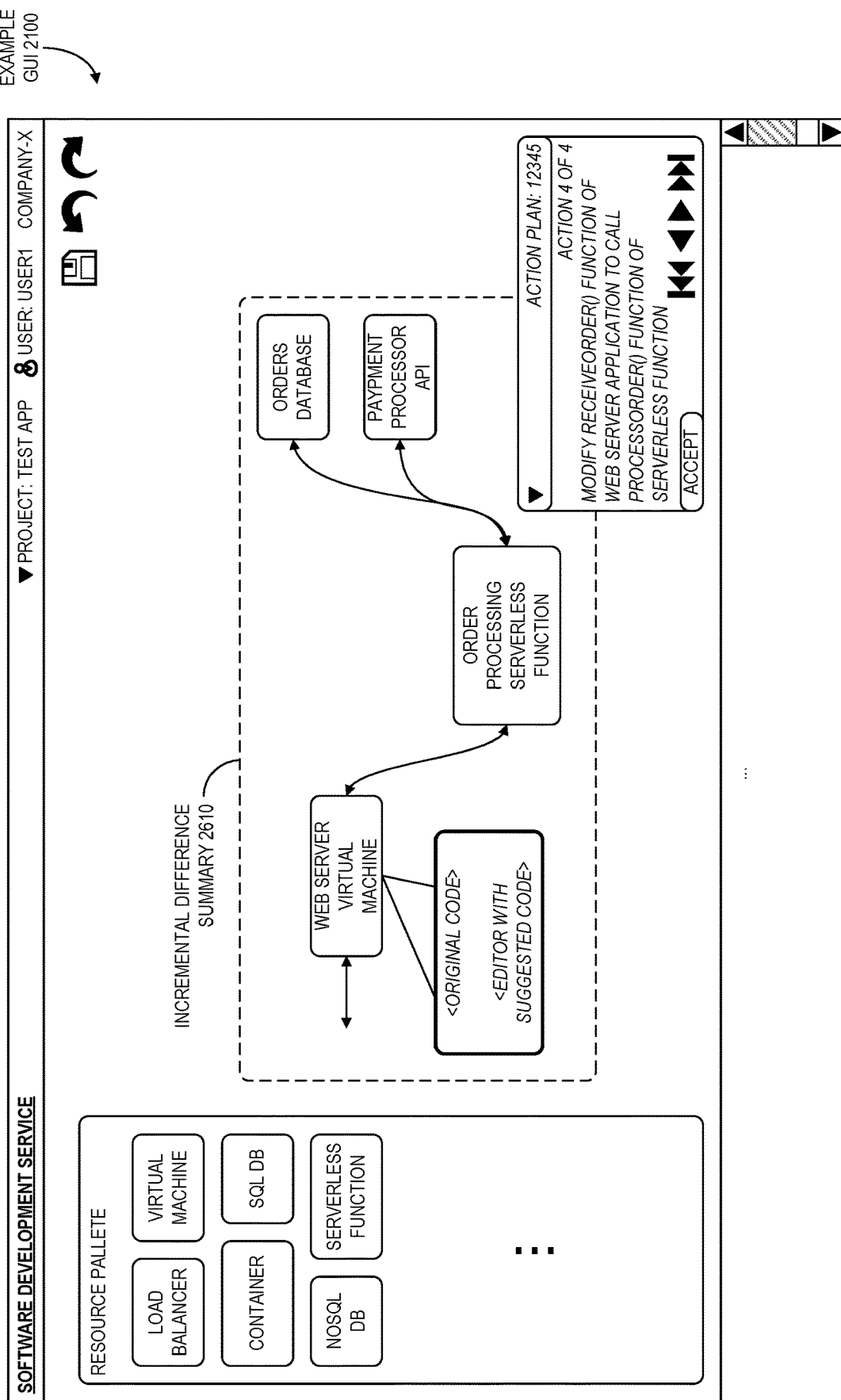

The SDS interface controller 114 causes the display an incremental difference summary 2510 associated with an action (in this case, action 3 of 4) based on a difference between the prior system map and the post-action system map. The incremental difference summary 2510 includes the change associated with the step, here, deleting the virtual machine. The GUI 2100 includes an accept button that the user can use to accept the change associated with the displayed step. The user selecting the next action button causes the SDS interface controller 114 to display the next incremental difference, as shown in FIG. 26.

The SDS interface controller 114 causes the display an incremental difference summary 2610 associated with an action (in this case, action 4 of 4) based on a difference between the prior system map and the post-action system map. The incremental difference summary 2610 includes the change associated with the step, here, updating code of the web server. The GUI 2100 can include a code editor displaying the code of the web server. The editor can include sample code generated with the action plan (e.g., from a code generation model). The GUI 2100 includes an accept button that the user can use to accept the change associated with the displayed step.

In some examples, once the changes are accepted, the SDS 110 can generate a final system map incorporating all of the changes and cause the deployment of the software system based on the final system map.

Figure 27:
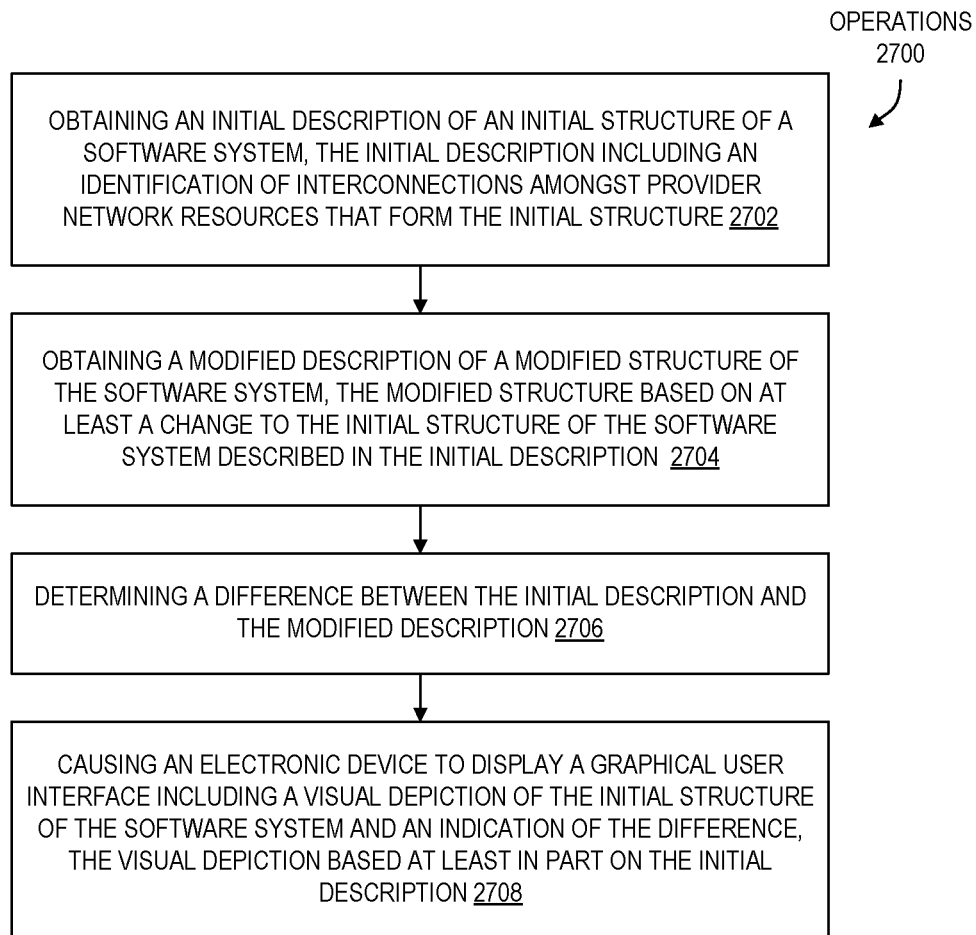
FIG. 27 is a flow diagram illustrating operations of a method for displaying a graphical user interface of a software development system according to some examples.

FIG. 27 is a flow diagram illustrating operations of a method 2700 for displaying a graphical user interface of a software development system according to some examples. Some or all of the operations 1600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 2700 are performed by the SDS 110 of the other figures.

The operations 2700 include, at block 2702, obtaining an initial description of an initial structure of a software system, the initial description including an identification of interconnections amongst provider network resources that form the initial structure. For example, the initial description can be a system map including an identification of the various resources of a software system and their connections or dependencies, such as the original system map 2061.

The operations 2700 further include, at block 2704, obtaining a modified description of a modified structure of the software system, the modified structure based on at least a change to the initial structure of the software system described in the initial description. The modified description can be a partial or full map representing the change (e.g., a partial map including the changes relative to a prior map, the full map representing the system as a whole), such as action maps 2062.

The operations 2700 further include, at block 2706, determining a difference between the initial description and the modified description. An exemplary difference is the addition or removal of a system resource or a connection between system resources.

The operations 2700 further include, at block 2708, causing an electronic device to display a graphical user interface including a visual depiction of the initial structure of the software system and an indication of the difference, the visual depiction based at least in part on the initial description. Exemplary difference indicators include icons, color, line weight, etc. associated with the particular difference. For example, a "NEW" icon or green border could indicate a difference of a new component, whereas a "DELETED" or red border could indicate a difference of a removed component.

Figure 28:
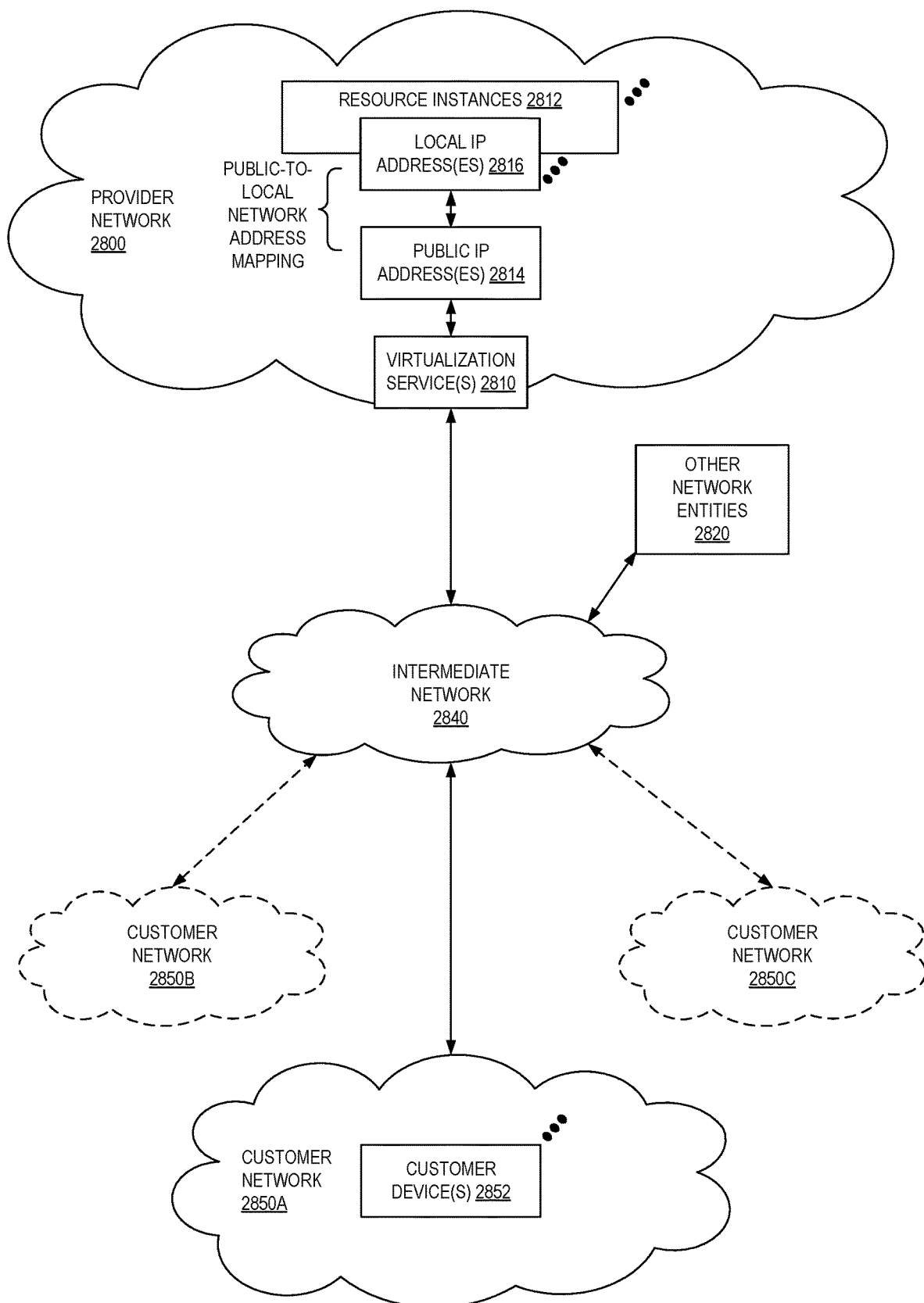
FIG. 28 illustrates an example provider network environment according to some examples.

FIG. 28 illustrates an example provider network (or "service provider system") environment according to some examples. A provider network 2800 can provide resource virtualization to customers via one or more virtualization services 2810 that allow customers to purchase, rent, or otherwise obtain instances 2812 of virtualized resources, including but not limited to computation and storage resources, implemented on devices within the provider network or networks in one or more data centers. Local Internet Protocol (IP) addresses 2816 can be associated with the resource instances 2812; the local IP addresses are the internal network addresses of the resource instances 2812 on the provider network 2800. In some examples, the provider network 2800 can also provide public IP addresses 2814 and/or public IP address ranges (e.g., Internet Protocol version 4 (IPv4) or Internet Protocol version 6 (IPv6) addresses) that customers can obtain from the provider 2800.

Conventionally, the provider network 2800, via the virtualization services 2810, can allow a customer of the service provider (e.g., a customer that operates one or more customer networks 2850A-2850C (or "client networks") including one or more customer device(s) 2852) to dynamically associate at least some public IP addresses 2814 assigned or allocated to the customer with particular resource instances 2812 assigned to the customer. The provider network 2800 can also allow the customer to remap a public IP address 2814, previously mapped to one virtualized computing resource instance 2812 allocated to the customer, to another virtualized computing resource instance 2812 that is also allocated to the customer. Using the virtualized computing resource instances 2812 and public IP addresses 2814 provided by the service provider, a customer of the service provider such as the operator of the customer network(s) 2850A-2850C can, for example, implement customer-specific applications and present the customer's applications on an intermediate network 2840, such as the Internet. Other network entities 2820 on the intermediate network 2840 can then generate traffic to a destination public IP address 2814 published by the customer network(s) 2850A-2850C; the traffic is routed to the service provider data center, and at the data center is routed, via a network substrate, to the local IP address 2816 of the virtualized computing resource instance 2812 currently mapped to the destination public IP address 2814. Similarly, response traffic from the virtualized computing resource instance 2812 can be routed via the network substrate back onto the intermediate network 2840 to the source entity 2820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 2800; a customer can then assign their allocated public IP addresses to particular resource instances allocated to the customer. These public IP addresses can be referred to as customer public IP addresses, or simply customer IP addresses. Instead of being assigned by the provider network 2800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 29:
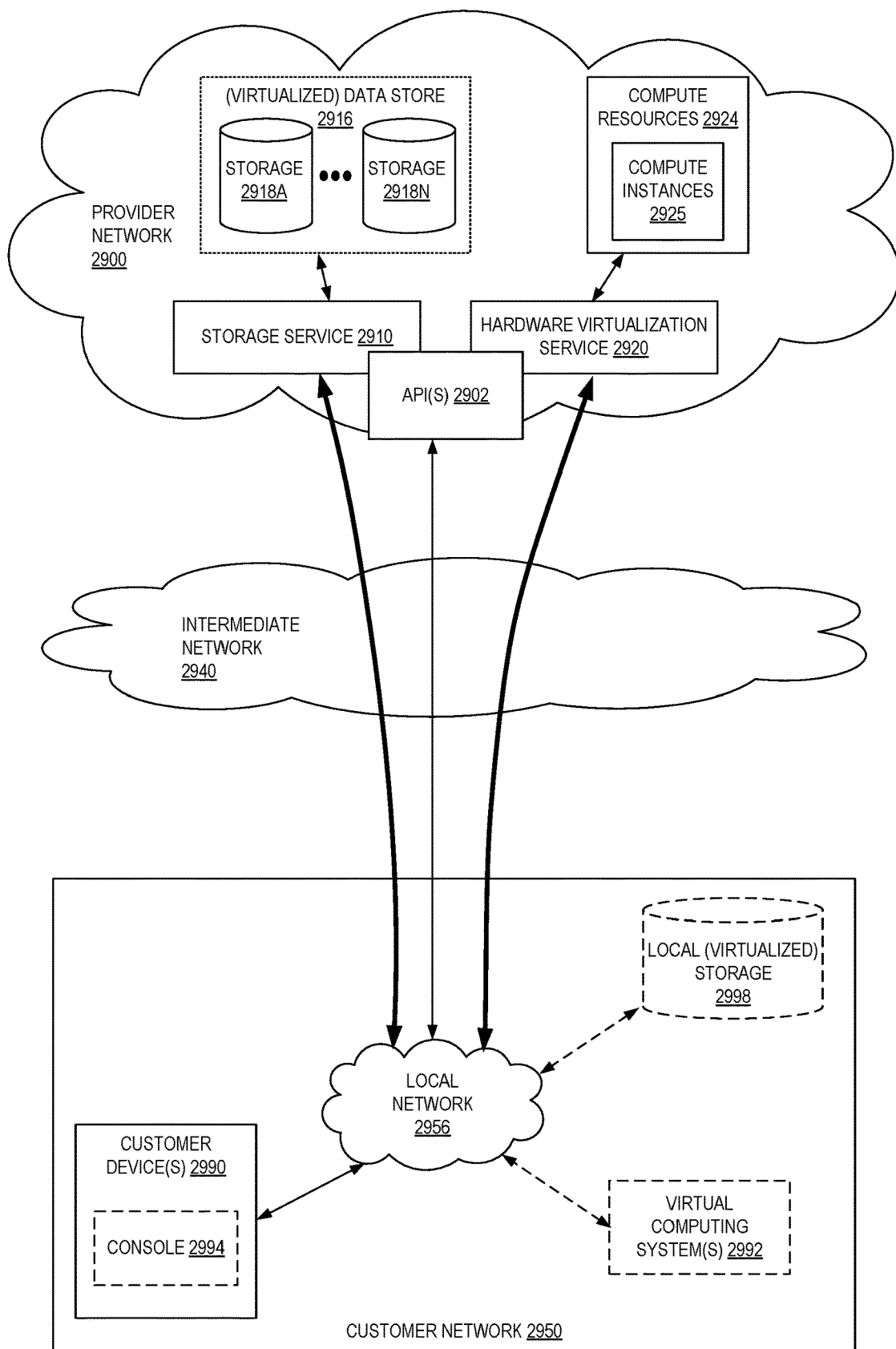
FIG. 29 is a block diagram of an example provider network that provides a storage service and a hardware virtualization service to customers according to some examples.

FIG. 29 is a block diagram of an example provider network environment that provides a storage service and a hardware virtualization service to customers, according to some examples. A hardware virtualization service 2920 provides multiple compute resources 2924 (e.g., compute instances 2925, such as VMs) to customers. The compute resources 2924 can, for example, be provided as a service to customers of a provider network 2900 (e.g., to a customer that implements a customer network 2950). Each computation resource 2924 can be provided with one or more local IP addresses. The provider network 2900 can be configured to route packets from the local IP addresses of the compute resources 2924 to public Internet destinations, and from public Internet sources to the local IP addresses of the compute resources 2924.

The provider network 2900 can provide the customer network 2950, for example coupled to an intermediate network 2940 via a local network 2956, the ability to implement virtual computing systems 2992 via the hardware virtualization service 2920 coupled to the intermediate network 2940 and to the provider network 2900. In some examples, the hardware virtualization service 2920 can provide one or more APIs 2902, for example a web services interface, via which the customer network 2950 can access functionality provided by the hardware virtualization service 2920, for example via a console 2994 (e.g., a web-based application, standalone application, mobile application, etc.) of a customer device 2990. In some examples, at the provider network 2900, each virtual computing system 2992 at the customer network 2950 can correspond to a computation resource 2924 that is leased, rented, or otherwise provided to the customer network 2950.

From an instance of the virtual computing system(s) 2992 and/or another customer device 2990 (e.g., via console 2994), the customer can access the functionality of a storage service 2910, for example via the one or more APIs 2902, to access data from and store data to storage resources 2918A-2918N of a virtual data store 2916 (e.g., a folder or "bucket," a virtualized volume, a database, etc.) provided by the provider network 2900. In some examples, a virtualized data store gateway (not shown) can be provided at the customer network 2950 that can locally cache at least some data, for example frequently accessed or critical data, and that can communicate with the storage service 2910 via one or more communications channels to upload new or modified data from a local cache so that the primary store of data (the virtualized data store 2916) is maintained. In some examples, a user, via the virtual computing system 2992 and/or another customer device 2990, can mount and access virtual data store 2916 volumes via the storage service 2910 acting as a storage virtualization service, and these volumes can appear to the user as local (virtualized) storage 2998.

While not shown in FIG. 29, the virtualization service(s) can also be accessed from resource instances within the provider network 2900 via the API(s) 2902. For example, a customer, appliance service provider, or other entity can access a virtualization service from within a respective virtual network on the provider network 2900 via the API(s) 2902 to request allocation of one or more resource instances within the virtual network or within another virtual network.

Figure 30:
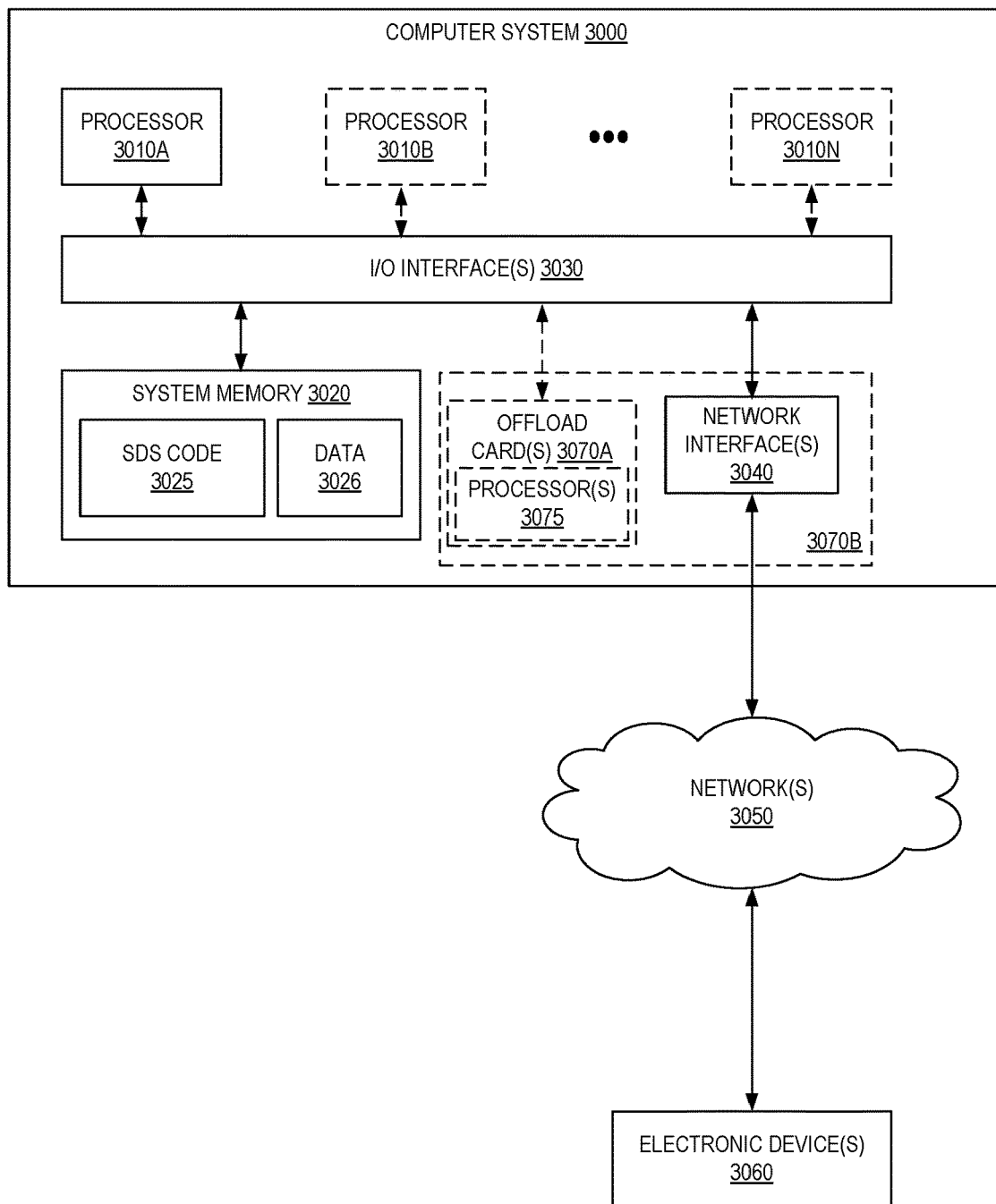
FIG. 30 is a block diagram illustrating an example computer system that can be used in some examples.

In some examples, a system that implements a portion or all of the techniques described herein can include a general-purpose computer system, such as the computer system 3000 (also referred to as a computing device or electronic device) illustrated in FIG. 30, that includes, or is configured to access, one or more computer-accessible media. In the illustrated example, the computer system 3000 includes one or more processors 3010 coupled to a system memory 3020 via an input/output (I/O) interface 3030. The computer system 3000 further includes a network interface 3040 coupled to the I/O interface 3030. While FIG. 30 shows the computer system 3000 as a single computing device, in various examples the computer system 3000 can include one computing device or any number of computing devices configured to work together as a single computer system 3000.

In various examples, the computer system 3000 can be a uniprocessor system including one processor 3010, or a multiprocessor system including several processors 3010 (e.g., two, four, eight, or another suitable number). The processor(s) 3010 can be any suitable processor(s) capable of executing instructions. For example, in various examples, the processor(s) 3010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 3010 can commonly, but not necessarily, implement the same ISA.

The system memory 3020 can store instructions and data accessible by the processor(s) 3010. In various examples, the system memory 3020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 3020 as SDS code 3025 (e.g., executable to implement, in whole or in part, an LLM service such as those described herein) and data 3026.

In some examples, the I/O interface 3030 can be configured to coordinate I/O traffic between the processor 3010, the system memory 3020, and any peripheral devices in the device, including the network interface 3040 and/or other peripheral interfaces (not shown). In some examples, the I/O interface 3030 can perform any necessary protocol, timing, or other data transformations to convert data signals from one component (e.g., the system memory 3020) into a format suitable for use by another component (e.g., the processor 3010). In some examples, the I/O interface 3030 can include support for devices attached through various types of peripheral buses, such as a variant of the Peripheral Component Interconnect (PCI) bus standard or the Universal Serial Bus (USB) standard, for example. In some examples, the function of the I/O interface 3030 can be split into two or more separate components, such as a north bridge and a south bridge, for example. Also, in some examples, some or all of the functionality of the I/O interface 3030, such as an interface to the system memory 3020, can be incorporated directly into the processor 3010.

The network interface 3040 can be configured to allow data to be exchanged between the computer system 3000 and other devices 3060 attached to a network or networks 3050, such as other computer systems or devices as illustrated in FIG. 1, for example. In various examples, the network interface 3040 can support communication via any suitable wired or wireless general data networks, such as types of Ethernet network, for example. Additionally, the network interface 3040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 3000 includes one or more offload cards 3070A or 3070B (including one or more processors 3075, and possibly including the one or more network interfaces 3040) that are connected using the I/O interface 3030 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 3000 can act as a host electronic device (e.g., operating as part of a hardware virtualization service) that hosts compute resources such as compute instances, and the one or more offload cards 3070A or 3070B execute a virtualization manager that can manage compute instances that execute on the host electronic device. As an example, in some examples the offload card(s) 3070A or 3070B can perform compute instance management operations, such as pausing and/or un-pausing compute instances, launching and/or terminating compute instances, performing memory transfer/copying operations, etc. These management operations can, in some examples, be performed by the offload card(s) 3070A or 3070B in coordination with a hypervisor (e.g., upon a request from a hypervisor) that is executed by the other processors 3010A-3010N of the computer system 3000. However, in some examples the virtualization manager implemented by the offload card(s) 3070A or 3070B can accommodate requests from other entities (e.g., from compute instances themselves), and cannot coordinate with (or service) any separate hypervisor.

In some examples, the system memory 3020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 3000 via the I/O interface 3030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 3000 as the system memory 3020 or another type of memory. Further, a computer-accessible medium can include transmission media or signals such as electrical, electromagnetic, or digital signals, conveyed via a communication medium such as a network and/or a wireless link, such as can be implemented via the network interface 3040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 2918A-2918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
obtaining an initial description of an initial structure of a software system, the initial description including an identification of interconnections amongst provider network resources that form the initial structure, wherein the interconnections include application programming interface calls between the provider network resources;
obtaining a modified description of a modified structure of the software system, the modified structure based on at least a change to the initial structure of the software system described in the initial description;
determining a difference between the initial description and the modified description, wherein the difference is at least one of a deletion of a provider network resource, an addition of a provider network resource, or a change to an interconnection between provider network resources; and
causing an electronic device to display a graphical user interface including a visual depiction of the initial structure of the software system and an indication of the difference, the visual depiction based at least in part on the initial description, wherein the visual depiction includes nodes interconnected by one or more edges, each node corresponding to at least one resource of the provider network resources, each edge corresponding to an interconnection of the provider network resources.

2. The computer-implemented method of claim 1, further comprising:
receiving, from the electronic device, a description of the change entered into a chat-based interface, wherein the graphical user interface further includes the chat-based interface, and wherein obtaining the modified description of the modified structure of the software system includes:
prompting a large language model (LLM) with a prompt to generate the modified description of the modified structure of the software system, the prompt including the description of the change and the initial description of the initial structure of the software system; and
receiving, from the LLM, the modified description of the modified structure of the software system.

3. The computer-implemented method of claim 1, further comprising:
receiving, from the electronic device, a description of the change based on an interaction with the visual depiction of the initial structure of the software system, wherein obtaining the modified description of the modified structure of the software system includes:
prompting a large language model (LLM) with a prompt to generate the modified description of the modified structure of the software system, the prompt including the description of the change and the initial description of the initial structure of the software system; and
receiving, from the LLM, the modified description of the modified structure of the software system.

4. The method of claim 1, wherein the indication of the difference is at least one of an icon overlaying a changed resource or connection, a changed line weight to the changed resource or connection, or a changed color to the changed resource or connection.

5. A computer-implemented method comprising:
obtaining an initial description of an initial structure of a software system, the initial description including an identification of interconnections amongst provider network resources that form the initial structure;
obtaining a modified description of a modified structure of the software system, the modified structure based on at least a change to the initial structure of the software system described in the initial description;
determining a difference between the initial description and the modified description;
causing an electronic device to display a graphical user interface including a visual depiction of the initial structure of the software system and a visual indication of the difference, the visual depiction based at least in part on the initial description; and
obtaining a second modified description of a second modified structure of the software system, the second modified structure based at least in part on a change to the modified structure of the software system described in the modified description, wherein the change to the initial structure of the software system described in the initial description and the change to the modified structure of the software system described in the modified description are part of an action plan generated by a large language model to move the software system from a current state to an updated state.

6. The computer-implemented method of claim 5, wherein the difference is at least one of a deletion of a provider network resource, an addition of a provider network resource, or a change to an interconnection between provider network resources.

7. The computer-implemented method of claim 5, wherein the visual indication of the difference is at least one of an icon overlaying a changed resource or connection, a changed line weight to the changed resource or connection, or a changed color to the changed resource or connection.

8. The computer-implemented method of claim 5, further comprising:
determining a second difference between the modified structured and the second modified description; and
causing the electronic device to display the graphical user interface including a second visual depiction of the modified structure of the software system and an indication of the second difference, the second visual depiction based at least in part on the modified description.

9. The computer-implemented method of claim 5, wherein the graphical user interface includes a forward button and a back button, and further comprising:
receiving, from the electronic device, an indication of an interaction with the back button; and
causing the electronic device to display the graphical user interface including the visual depiction of the initial structure of the software system and the indication of the difference.

10. The computer-implemented method of claim 5, further comprising:
receiving, from the electronic device, a description of the change entered into a chat-based interface, wherein the graphical user interface further includes the chat-based interface, and wherein obtaining the modified description of the modified structure of the software system includes:
prompting a large language model (LLM) with a prompt to generate the modified description of the modified structure of the software system, the prompt including the description of the change and the initial description of the initial structure of the software system; and
receiving, from the LLM, the modified description of the modified structure of the software system.

11. The computer-implemented method of claim 5, further comprising:
receiving, from the electronic device, a description of the change based on an interaction with the visual depiction of the initial structure of the software system, wherein obtaining the modified description of the modified structure of the software system includes:
prompting a large language model (LLM) with a prompt to generate the modified description of the modified structure of the software system, the prompt including the description of the change and the initial description of the initial structure of the software system; and
receiving, from the LLM, the modified description of the modified structure of the software system.

12. The computer-implemented method of claim 5, wherein the visual depiction includes nodes interconnected by one or more edges, each node corresponding to at least one resource of the provider network resources of the initial description, each edge corresponding to an interconnection of the provider network resources.

13. A system comprising:
a data store hosted by a multi-tenant provider network; and
a software development service provided by the multi-tenant provider network, the software development service configured to:
obtain an initial description of an initial structure of a software system from the data store, the initial description including an identification of interconnections amongst provider network resources that form the initial structure;
obtain a modified description of a modified structure of the software system, the modified structure based on at least a change to the initial structure of the software system described in the initial description;
determine a difference between the initial description and the modified description;
cause an electronic device to display a graphical user interface including a visual depiction of the initial structure of the software system and a visual indication of the difference, the visual depiction based at least in part on the initial description; and
obtain a second modified description of a second modified structure of the software system, the second modified structure based on at least a change to the modified structure of the software system described in the modified description, wherein the change to the initial structure of the software system described in the initial description and the change to the modified structure of the software system described in the modified description are part of an action plan generated by a large language model to move the software system from a current state to an updated state.

14. The system of claim 13, wherein the difference is at least one of a deletion of a provider network resource, an addition of a provider network resource, or a change to an interconnection between provider network resources.

15. The system of claim 13, wherein the visual indication of the difference is at least one of an icon overlaying a changed resource or connection, a changed line weight to the changed resource or connection, or a changed color to the changed resource or connection.

16. The system of claim 13, wherein the software development service is further configured to:
determine a second difference between the modified structured and the second modified description; and
cause the electronic device to display the graphical user interface including a second visual depiction of the modified structure of the software system and an indication of the second difference, the second visual depiction based at least in part on the modified description.

17. The system of claim 13, wherein the graphical user interface includes a forward button and a back button, and wherein the software development service is further configured to:
receive, from the electronic device, an indication of an interaction with the back button; and
cause the electronic device to display the graphical user interface including the visual depiction of the initial structure of the software system and the indication of the difference.

18. The system of claim 13, wherein the software development service is further configured to:
receive, from the electronic device, a description of the change entered into a chat-based interface, wherein the graphical user interface further includes the chat-based interface, and wherein to obtain the modified description, the software development service is further configured to:
prompt a large language model (LLM) with a prompt to generate the modified description of the modified structure of the software system, the prompt including the description of the change and the initial description of the initial structure of the software system; and
receive, from the LLM, the modified description of the modified structure of the software system.

19. The system of claim 13, wherein the software development service is further configured to:
receive, from the electronic device, a description of the change based on an interaction with the visual depiction of the initial structure of the software system, wherein to obtain the modified description, the software development service is further configured to:
prompt a large language model (LLM) with a prompt to generate the modified description of the modified structure of the software system, the prompt including the description of the change and the initial description of the initial structure of the software system; and
receive, from the LLM, the modified description of the modified structure of the software system.

20. The system of claim 13, wherein the visual depiction includes nodes interconnected by one or more edges, each node corresponding to at least one resource of the provider network resources of the initial description, each edge corresponding to an interconnection of the provider network resources.

* * * * *